(12) United States Patent
Fagan et al.

(10) Patent No.: US 9,205,914 B1
(45) Date of Patent: Dec. 8, 2015

(54) DISTRIBUTED ARCHITECTURE FOR A SYSTEM AND A METHOD OF OPERATION OF THE SYSTEM INCORPORATING A GRAPHICAL USER INTERFACE CONTROLLING FUNCTIONS IN A VEHICLE CABIN

(71) Applicant: BOMBARDIER INC., Dorval (CA)

(72) Inventors: Tim Michael Fagan, Beaconsfield (CA);
Jeff Bartenbach, Seattle, WA (US);
Erick Waldman, Seattle, WA (US);
Brian Conner, Seattle, WA (US);
Linsey Nancarrow, Seattle, WA (US);
Tom Hobbs, Seattle, WA (US); Chris Pirie, Mulkilteo, WA (US); Heidi McBride, Seattle, WA (US); Sebastian Petry, Seattle, WA (US)

(73) Assignee: BOMBARDIER INC., Dorval, Quebec (CA)

(*) Notice: Subject to any disclaimer, the term of this patent is extended or adjusted under 35 U.S.C. 154(b) by 0 days.

(21) Appl. No.: 14/164,858

(22) Filed: Jan. 27, 2014

Related U.S. Application Data

(60) Provisional application No. 61/759,139, filed on Jan. 31, 2013.

(51) Int. Cl.
*B64C 19/00* (2006.01)
(52) U.S. Cl.
CPC ...................... *B64C 19/00* (2013.01)
(58) Field of Classification Search
CPC ...................................................... B64C 19/00
USPC ................................................ 701/3, 36, 49
See application file for complete search history.

(56) References Cited

U.S. PATENT DOCUMENTS

| | | | |
|---|---|---|---|
| 5,555,458 | A | 9/1996 | Large |
| 6,249,913 | B1 | 6/2001 | Galipeau et al. |
| 6,343,127 | B1 | 1/2002 | Billoud |

(Continued)

FOREIGN PATENT DOCUMENTS

| | | |
|---|---|---|
| DE | 102006006363 A1 | 8/2007 |
| DE | 102007043379 A1 | 4/2009 |
| JP | 2003182351 A | 7/2003 |

OTHER PUBLICATIONS

Frequent Flying, "Vintage Airline Seat Map Eastern Air Lines Boeing 727-100", Jan 18,2012,2 pages, downloaded http://frequentlyflying.boardingarea.com/vintage-airline-seat -map-eastern-air-lines-boeing-727-100/.

(Continued)

*Primary Examiner* — Mary Cheung
*Assistant Examiner* — Brian P Sweeney
(74) *Attorney, Agent, or Firm* — Thomas, Karceski & Karmilovich, PC

(57) ABSTRACT

A distributed architecture for multi-nodal control of functions in an aircraft cabin. The distributed architecture includes a processor, a controller operatively connected to the processor, a passenger IO node operatively connected to the controller, and a crew IO node operatively connected to the controller. The passenger IO node and the crew IO node are capable of controlling at least one of light intensity in the aircraft cabin, color of light in the aircraft cabin, temperature in the vehicle cabin, and a degree of openness of one or more window shades in the aircraft cabin. A method and an executable computer program product also are provided.

33 Claims, 13 Drawing Sheets

(56) References Cited

U.S. PATENT DOCUMENTS

| | | |
|---|---|---|
| 6,448,907 B1 | 9/2002 | Naclerio |
| 7,114,171 B2 | 9/2006 | Brady, Jr. et al. |
| 7,500,716 B2 | 3/2009 | Guerin et al. |
| 7,878,586 B2 | 2/2011 | Kneller et al. |
| 7,908,158 B2 | 3/2011 | Stirlen et al. |
| 8,037,500 B2 | 10/2011 | Margis et al. |
| 8,065,463 B2 | 11/2011 | Porath et al. |
| 8,082,569 B2 | 12/2011 | Brady, Jr. et al. |
| 8,380,393 B1 | 2/2013 | Ohtomo |
| 2001/0023499 A1 | 9/2001 | Wakahara |
| 2005/0121978 A1 | 6/2005 | McAvoy |
| 2005/0185399 A1 | 8/2005 | Beermann et al. |
| 2005/0280524 A1 | 12/2005 | Boone et al. |
| 2006/0045107 A1* | 3/2006 | Kucenas et al. ............... 370/401 |
| 2006/0155429 A1 | 7/2006 | Boone et al. |
| 2007/0061847 A1 | 3/2007 | Callahan et al. |
| 2007/0107277 A1 | 5/2007 | Simms et al. |
| 2007/0236926 A1 | 10/2007 | Guard et al. |
| 2008/0104642 A1 | 5/2008 | Galipeau et al. |
| 2008/0144158 A1 | 6/2008 | Stavaeus et al. |
| 2008/0157997 A1 | 7/2008 | Bleacher et al. |
| 2008/0230653 A1 | 9/2008 | Mitchell et al. |
| 2008/0234893 A1* | 9/2008 | Mitchell et al. ............... 701/36 |
| 2009/0079705 A1 | 3/2009 | Sizelove et al. |
| 2009/0083805 A1 | 3/2009 | Sizelove et al. |
| 2009/0109036 A1 | 4/2009 | Schalla et al. |
| 2009/0119431 A1 | 5/2009 | Porath et al. |
| 2009/0288123 A1 | 11/2009 | Havlovick et al. |
| 2010/0064327 A1 | 3/2010 | Lynch et al. |
| 2010/0070089 A1 | 3/2010 | Harrod et al. |
| 2010/0176632 A1 | 7/2010 | Alford et al. |
| 2010/0187354 A1 | 7/2010 | Helfrich |
| 2011/0082616 A1 | 4/2011 | Small et al. |
| 2011/0126242 A1 | 5/2011 | Cline et al. |
| 2011/0162015 A1 | 6/2011 | Holyoake et al. |
| 2011/0174926 A1 | 7/2011 | Margis et al. |
| 2012/0060524 A1 | 3/2012 | Al-Ali |
| 2012/0110517 A1 | 5/2012 | Sparks et al. |
| 2012/0132746 A1 | 5/2012 | Sizelove |
| 2012/0254932 A1 | 10/2012 | Hudson et al. |
| 2013/0027954 A1 | 1/2013 | Boomgarden et al. |
| 2013/0063340 A1 | 3/2013 | Mondragon et al. |
| 2013/0093220 A1 | 4/2013 | Pajic |
| 2013/0161971 A1 | 6/2013 | Bugno et al. |
| 2013/0185662 A1 | 7/2013 | Quattrocolo et al. |
| 2014/0067208 A1 | 3/2014 | Klappert et al. |
| 2014/0239677 A1 | 8/2014 | Laib et al. |

OTHER PUBLICATIONS

Rockwell Collins, "Bombardier CES H D" brochure, 147-1351-000 Oct. 2011, © 2011 Rockwell Collins Inc, 8 pages.

Rosen Aviation, "Ultra CMS Technical Manual," Revision Date Mar. 11, 2010, Copyright 2010, Document No. 102350 Rev A, 28 pages.

Honeywell "Ovation Select 200C Personal Control Unit" brochure, A60-1 090-000-000, Mar. 2009, © 2009 Honeywell International Inc., 4 pages.

\* cited by examiner

DISTRIBUTED ARCHITECTURE FOR A SYSTEM AND A METHOD OF OPERATION OF THE SYSTEM INCORPORATING A GRAPHICAL USER INTERFACE CONTROLLING FUNCTIONS IN A VEHICLE CABIN

CROSS-REFERENCE TO RELATED APPLICATION(S)

This is a United States Non-Provisional Patent Application that relies for priority on U.S. Provisional Patent Application Ser. No. 61/759,139, filed on Jan. 31, 2013, the entire contents of which are incorporated herein by reference.

FIELD OF THE INVENTION

The present patent application is directed to a distributed architecture for a system and a method of operation of the system incorporating a graphical user interface that provides control over one or more functions within the cabin of a vehicle, such as an aircraft. More specifically, the present invention provides a multi-point interface that permits one or more persons on an aircraft to control various functions within the cabin of the aircraft.

DESCRIPTION OF THE RELATED ART

As should be apparent to those skilled in the art, there are a number of functions that may be controlled within the cabin of an aircraft. The functions may be divided into at least two categories: (1) functions related to environment, and (2) functions related to passenger comfort and entertainment.

Environmental functions include, but are not limited to, things such as cabin temperature, the intensity of the cabin lighting, and the degree to which the window shades are open, among other variables.

Functions related to passenger comfort include those related to actuation of a personal reading light, control over the air flow through an overhead vent, positioning of the passenger seat (i.e., upright or reclined), and a remote call for a flight attendant (i.e., a flight attendant call button).

Other functions that are associated with passenger comfort include, but are not limited to control over media type (i.e., audio and/or video), content, and volume. With respect to content, selectivity may be provided so that a passenger may select a genre of music (i.e., jazz music or pop music) or a genre of movies (i.e., comedy or drama), among other variations. As should be apparent to any passenger, individuals may control the volume of the media that has been selected.

At present, selected the environmental functions typically are adjusted by the flight crew for the comfort of all passengers within the aircraft. For example, temperature typically is controlled at a central location within the aircraft cabin, via a thermostat or similar temperature control device. Similarly, the main cabin lighting in the aircraft typically is controlled via a central panel available to the flight crew. As a result, the flight crew can turn on, turn off, or dim the main lights within the aircraft cabin for all of the passengers.

As should be apparent to the airplane traveler, functions associated with passenger comfort and entertainment typically are accessible directly from the passenger's seat.

This basic operational approach to aircraft cabin functions has been employed for many years. As presently configured, the control systems for the environment and for passenger comfort and entertainment within an aircraft operate independently from one another.

Recently, a desire has developed to improve the manner in which aircraft cabin functions are controlled. Specifically, a desire has arisen for a more centralized and coordinated operation of selected functions that are available within the cabin of an aircraft.

SUMMARY OF THE INVENTION

The present invention provides a distributed architecture for an aircraft that permits users, whether flight crew, passengers, or other individuals, to control one or more functions within an aircraft cabin.

In particular, it is one aspect of the present invention to provide a distributed architecture for multi-nodal control of functions in an aircraft cabin. The distributed architecture includes a processor, a controller operatively connected to the processor, a passenger IO node operatively connected to the controller, and a crew IO node operatively connected to the controller. The passenger IO node and the crew IO node are capable of controlling at least one of light intensity in the aircraft cabin, color of light in the aircraft cabin, temperature in the vehicle cabin, and a degree of openness of one or more window shades in the aircraft cabin.

It is another aspect of the present invention to provide a distributed architecture that also includes a bulkhead IO node, disposed on a bulkhead within the aircraft cabin, capable of controlling at least one of light intensity in the aircraft cabin, color of light in the aircraft cabin, temperature in the aircraft cabin, and a degree of openness of one or more window shades in the aircraft cabin.

Still further, the present invention contemplated that the distributed architecture may include a side ledge panel IO node, capable of controlling at least one of light intensity in the aircraft cabin, color of light in the aircraft cabin, temperature in the aircraft cabin, a degree of openness of one or more window shades in the aircraft cabin, media type, media content, and media volume, wherein the side ledge comprises at least one of a ledge adjacent to a passenger seat, a cabinet adjacent to a divan, or a night stand adjacent to a bed.

In one contemplated embodiment, the controller includes a command hierarchy to prioritize inputs received from the bulkhead IO node, the side ledge IO node, the passenger 10 node, and the crew IO node, thereby avoiding conflicts between the inputs.

The present invention also provides for a method where the plurality of controllable parameters are associated with at least one of the entire cabin of the aircraft, at least one zone within the cabin of the aircraft, or at least one seat within the cabin of the aircraft.

In another contemplated embodiment, the distributed architecture of the present invention provides that the plurality of controllable parameters also include at least one of media type, media content, or media volume.

The present invention also provides for a method of operation for a system incorporating a graphical user interface for a device within a cabin of a vehicle. The method includes receiving a selection of the controllable parameter, displaying at least one control for the selected controllable parameter, receiving a control input for the selected controllable parameter, and adjusting the selected controllable parameter consistent with the control input. The controllable parameter include a plurality of controllable parameters selected from a group comprising light intensity, light color, temperature, the degree of openness of at least one window shade, scheduling, notes, reports, presets, and a passenger manifest. Additionally, the graphical user interface encompasses at least two of a passenger IO node, a crew IO node, a bulkhead IO node, and a side ledge IO node.

It is contemplated that the method of the present invention also may be structured so that the plurality of controllable parameters also includes one of media type, media content, or media volume.

The method of the present invention also may include placing the graphical user interface into a sleep mode if selection of a controllable parameter is not received.

With respect to the method, it is contemplated that the plurality of controllable parameters may be associated with the entire cabin of the aircraft, with at least one zone within the cabin of the aircraft and/or with at least one seat within the cabin of the aircraft.

In addition, with respect to the method, the plurality of controllable parameters may be controllable via an interface presenting an isometric view of at least a portion of the cabin of the aircraft.

The method contemplates that control over light intensity includes an illumination for at least one of a cabin light, a table light, and a reading light.

The method also contemplates that the media content may include a video library, an audio library, and a map view. Where a map view is provided, the map view may encompass a global map view and a local map view.

With respect to the method provided by the present invention, it is contemplated that the displaying of the menu for the controllable parameter includes displaying a light icon, a media icon, a thermostat icon, and a window shade icon.

The present invention also provides for an executable computer program product providing instructions for a method of operation for a system incorporating a graphical user interface for a device within a cabin of a vehicle. The program includes instructions for displaying a menu for at least one controllable parameter, receiving a selection of the controllable parameter, displaying at least one control for the selected controllable parameter, receiving a control input for the selected controllable parameter, and adjusting the selected controllable parameter consistent with the control input. The controllable parameter may encompass a plurality of controllable parameters selected from a group including light intensity, light color, temperature, the degree of openness of at least one window shade, scheduling, notes, reports, presets, and a passenger manifest. The graphical user interface may encompass at least two of a passenger IO node, a crew IO node, a bulkhead IO node, and a side ledge IO node.

The executable computer program product also may include instructions such that the plurality of controllable parameters also include at least one of media type, media content, or media volume.

With respect to the executable computer program product, the instructions also may include placing the graphical user interface into a sleep mode if selection of a controllable parameter is not received.

Concerning the executable computer program product, the plurality of controllable parameters may be associated with the entire cabin of the aircraft, with at least one zone within the cabin of the aircraft, and/or with at least one seat within the cabin of the aircraft.

Still further aspects of the present invention will be made apparent from the drawings and description that follows.

BRIEF DESCRIPTION OF THE DRAWINGS

The present invention will now be described in connection with the figures appended hereto, in which.

DETAILED DESCRIPTION OF EMBODIMENT(S) OF THE PRESENT INVENTION

Figure 1:
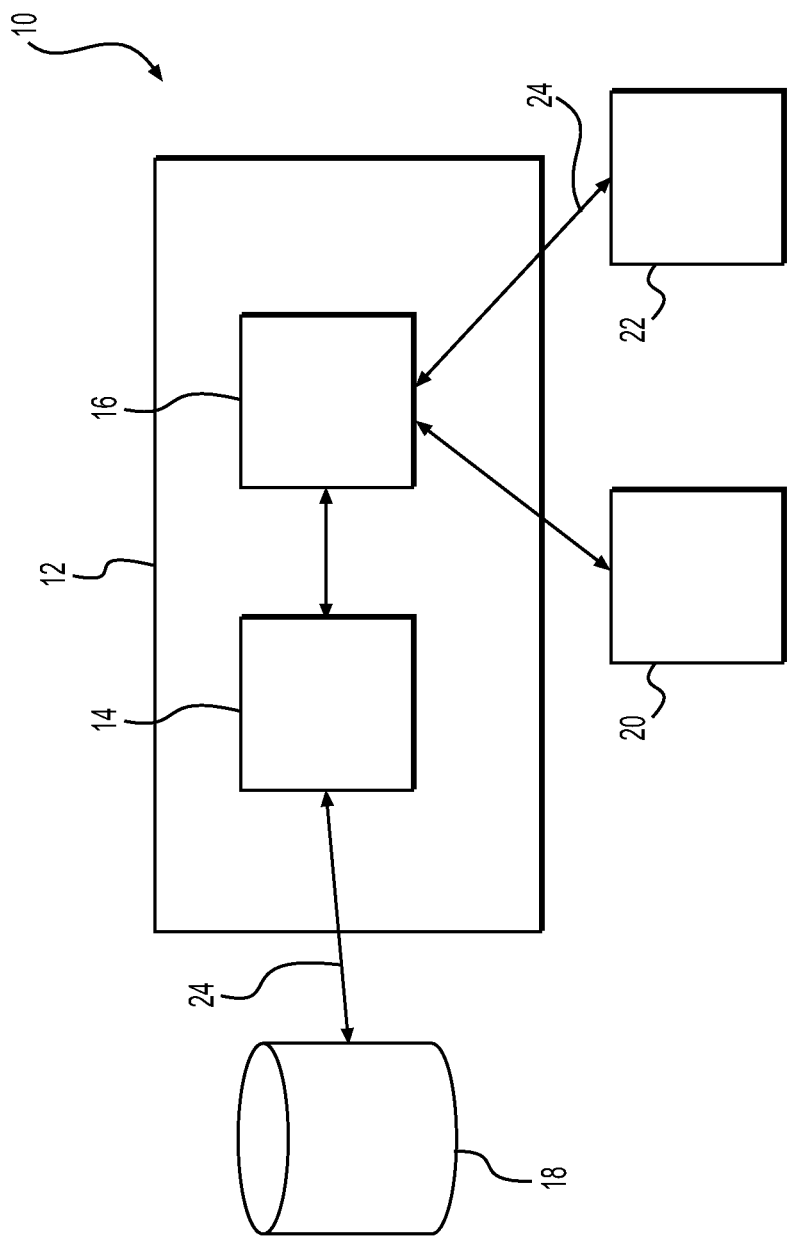
FIG. 1 is a graphical overview of one embodiment of the distributed architecture contemplated by the present invention.

The present invention will now be described in connection with one or more embodiments. The discussion of any one embodiment is not intended to be restrictive or limiting of the present invention. To the contrary, the embodiments described are intended to be illustrative of the broad scope of the present invention.

Among other aspects, the present invention addresses controls for parameters on board an aircraft including environmental functions and functions related to passenger comfort. As noted above, environmental functions include, but are not limited to, things such as cabin temperature, the intensity of the cabin lighting, and the degree to which the window shades are open, among other variables. Functions related to passenger comfort include those related to actuation of a personal reading light, control over the air flow through an overhead vent, positioning of the passenger seat (i.e., upright or reclined), and a remote call for a flight attendant (i.e., a flight attendant call button). Other functions that are associated with passenger comfort include, but are not limited to control over media type (i.e., audio and/or video), content, and volume. With respect to content, selectivity may be provided so that a passenger may select a genre of music (i.e., jazz music or pop music) or a genre of movies (i.e., comedy or drama), among other variations. Individuals may control the volume of the media that has been selected.

As should be apparent, and as will be made more apparent in the discussion that follows, the labels "environment" and "passenger comfort" when applied to specific functions that are controllable in an aircraft are merely provided to assist with an understanding of the present invention. Use of either of the labels is not intended to be limiting, as the labels are not considered to be mutually exclusive of one another or of other functions that are not highlighted herein. For example, control over the degree to which the window shades are opened qualifies as control over an environmental function and also over aspects of passenger comfort. The lights in the aircraft belong to the same, crossover category.

With respect to the present invention, the terms "front" (or "fore"), "rear" (or "aft"), left (or "port"), and right (or "starboard") are used in the conventional fashion when referring to an aircraft. These conventions refer to the front, rear, left, and right sides of an aircraft as determined by its normal, forward direction of travel.

In addition, reference is made to members of the flight crew on board the aircraft. The term "flight crew" is intended to be generic to any member of the flight crew, including the pilot, co-pilot, and/or flight attendants. In other words, the term "flight crew" is intended to refer to persons other than passengers on board the aircraft.

The term "bulkhead" is used in the discussion of the present invention. A bulkhead is wall that is disposed within the aircraft. A bulkhead may or may not be a structural component of the aircraft.

It is contemplated that the distributed architecture of the present invention (and associated features) may be provided on a corporate or private aircraft. In other words, it is contemplated that the present invention may be employed in an aircraft that typically has limited seating by comparison with a commercial, passenger aircraft. While corporate, business, or personal aircraft encompass the primary focus of the distributed architecture of the present invention, the present invention is not limited thereto. To the contrary, the present invention may be employed in any aircraft, including commercial passenger aircraft, without departing from the scope of the present invention.

In addition, while the present invention is contemplated to be employed on an aircraft, it is noted that the present invention may be employed in any other suitable environment. For example, the present invention may be practiced on a passenger car of a train, on board a ship, or any other suitable environment that should be apparent to those skilled in the art.

The distributed architecture 10 of the present invention is illustrated in FIG. 1. The distributed architecture includes a central processing unit 12 ("CPU") that includes a processor 14 and a controller 16. The CPU 12 may be a computer, as should be apparent to those skilled in the art. However, the term CPU 12 is not intended to be limited only to a computer or any part thereof. To the contrary, the term CPU 12 is intended to encompass any type of computing device that may operate to provide the functionality described herein.

The term "processor" is intended to broadly encompass any device capable of executing machine-readable instructions. In other words, the term "processor 14" is intended to refer to any device or component that processes instructions and data. As an example, semiconductor chips within a computer are considered to fall within the definition of the term "processor 14."

While it is contemplated that the processor 14 will be a single component of the distributed architecture 10 of the present invention, the present invention is not intended to be so limiting. The processor 14 may include multiple devices that are separate from one another, but cooperate together to process data and execute instructions. For example, the processor 14 may include a semiconductor processing chip and/or any other peripheral devices that support the operation of the semiconductor processing chip. Alternatively, the processor 14 may encompass processing chips that are located in separate systems, but which are operatively connected to provide the functionality described herein.

As also illustrated in FIG. 1, the CPU 12 includes a controller 16. In one embodiment of the present invention, it is contemplated that the controller 16 may be a hardware component that is separate from the processor 14. In a second contemplated embodiment, the controller 16 may be embodied in software (i.e., operating software) that runs on the central processing unit 12. In other words, in this second embodiment, the processor 14 may be the device on which the controller 16 is executed. In a third contemplated embodiment, the controller 16 may be a combination of hardware and software. Regardless of whether the controller 16 is hardware, software, or a combination of the two, it is contemplated that the controller 16 will facilitate communication between the processor 14 and any input/output ("IO") and/or peripheral devices connected thereto. The peripheral devices include the IO nodes that are discussed herein. The peripheral devices also include the input nodes that are discussed herein.

While the distributed architecture 10 is described in terms of a CPU 12, a processor 14, and a controller 16 (among other components), it is noted that this configuration is not intended to be illustrative of the breadth of the present invention. The configuration is not intended to exclude any possible server/client configurations. For example, the CPU 12 may be a server on which a client is resident. The controller 16 may be the client. In another configuration, the CPU 12 may be a server that provides access to an independent client. In still another configuration, the CPU 12 may be a router.

As should be apparent, there are many appellations that may be applied to the components comprising the distributed architecture 10. Those variations and equivalents are intended to be encompassed by the scope of the present invention.

As illustrated in FIG. 1, the processor 14 may connect to one or more databases 18. The database 18 may be a memory storage device, a device such as an MP3 player, a compact disc ("CD") player, a digital video disk ("DVD") player, or any other suitable storage and playback device. To emphasize the breadth of what is meant by the term, the database 18 may include, but is not limited to, any suitable memory on which the CPU 12 relies for its operation. The term database 18 should not be understood to be limited solely to memory devices.

It is noted that the distributed architecture 10 of the present invention also may be connected to other systems and processors on board the aircraft. For example, the distributed architecture 10 may receive input from a flight computer on board the aircraft. These other input devices are not illustrated for simplicity. It is noted, however, that other inputs may be provided to the distributed architecture 10 of the present invention without departing from the scope thereof.

The distributed architecture 10 of the present invention is intended to be specific to the passengers and flight crew on an aircraft. As a result, the CPU 12 is contemplated to connect to at least two IO nodes: (1) a passenger IO node 20 and (2) a crew IO node 22. The passenger IO node 20 receives input and provides output to the passenger. The crew IO node 22 receives input and provides output to members of the flight crew. Both the passenger IO node 20 and the crew IO node 22 connect to the controller 16, through which selected inputs and outputs are directed.

The passenger IO node 20 is contemplated to encompass any suitable input/output device that may be available to a passenger. Similarly, the crew IO node 22 is intended to encompass any suitable input/output device that may be available to a member of the flight crew. In other words, while the present invention will be described in connection with specific devices, the present invention is not intended to be limited thereby. Other devices may be provide or substituted for the devices described herein without departing from the scope of the present invention.

In addition, as will be made more apparent in the discussion that follows, the passenger IO node 20 and the crew IO node 22 are contemplated to provide overlapping functionality. Therefore, the discussion of a particular functionality with respect to one IO node 20, 22 does not preclude the same functionality from being provided via the other of the IO nodes 20, 22.

As illustrated in FIG. 1, the various components of the distributed architecture 10 connect to one another via communication lines 24. The communication lines 24 may be wired or wireless communication lines, as should be apparent to those skilled in the art. Wired communication lines encompass, but are not limited to, wired connections and docking stations (for one or more of the IO nodes). Wireless communication lines may be provided via any suitable data format including, but not limited to, a Bluetooth™ connection (where appropriate).

Additionally, the communication lines are illustrated as two-way communication channels. While depicted as two-way communication channels, it is noted that one-way communication channels may be employed without departing from the scope of the present invention. In addition, it is also contemplated that the communication channels 24 may encompass one or more busses that channel multiple channels of communication along a single communication line 24.

Figure 2:
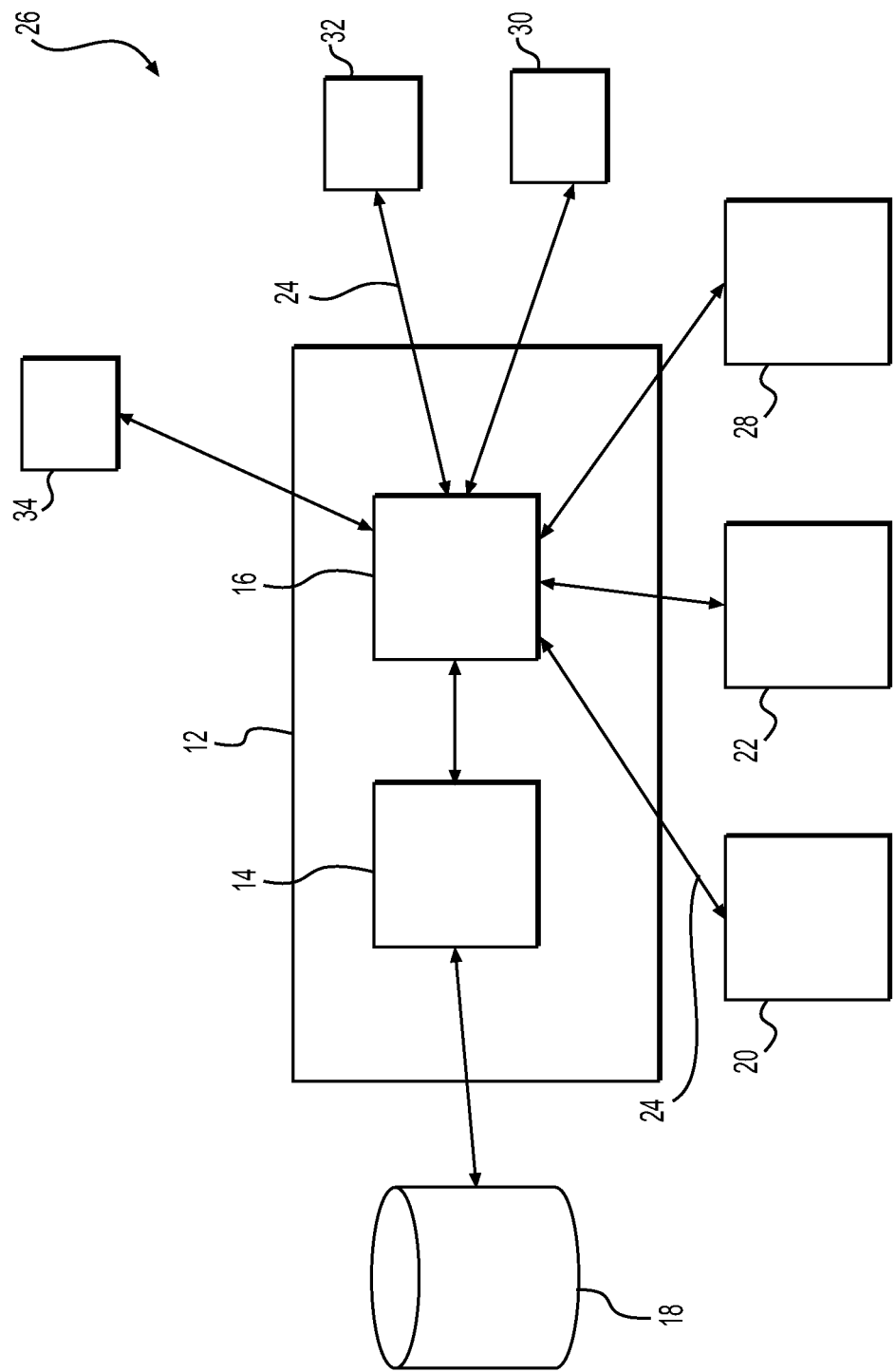
FIG. 2 is a graphical overview of a second embodiment of the distributed architecture contemplated by the present invention.

FIG. 2 illustrates a second embodiment of a distributed architecture 26 of the present invention. As will be made apparent from the discussion that follows, the second embodiment of the distributed architecture 26 may be considered as a variation of the first embodiment.

The distributed architecture 26 is directed to a location-oriented approach to the present invention rather than a person-oriented approach, as detailed in connection with the distributed architecture 10. The person-oriented approach that is employed for the distributed architecture 10 encompasses an architecture where an IO node is associated with an individual, such as a passenger or a member of the flight crew. The location-oriented approach for the distributed architecture 26 encompasses an architecture that relies, at least in part, on IO nodes that are placed at specific locations with the aircraft.

As will be made apparent in discussion that follows, there is an overlap between the first distributed architecture 10 and the second distributed architecture 26.

As illustrated in FIG. 2, the second distributed architecture 26 is similar to the first distributed architecture in that the distributed architecture 26 includes the CPU 12, the processor 14, the controller 16, and the database 18. The second distributed architecture 26 differs from the first distributed architecture 10 in that additional IO nodes are provided at specific locations within the aircraft cabin, as noted above.

As illustrated in FIG. 2, the second distributed architecture is contemplated to include the passenger IO node 20 and the crew IO node 22. In addition, the second distributed architecture 26 includes a bulkhead IO node 28, a side ledge IO node 30, a table IO node 32, and a window IO node 34. Details of the bulkhead IO node 28, the side ledge IO node 30, the table IO node 32, and the window IO node 34 are provided below. It is noted that the table IO node 32 and the window IO node 34 may be referred to solely as input nodes, since they are not contemplated to incorporate changeable output displays. However, as noted below, since the present invention does not preclude the table IO node 32 and/or the window IO node 34 from including variable displays, the table IO node 32 and the window IO node 34 are described both as IO and an input-only nodes.

As suggested by the nomenclature employed, the IO nodes 28, 30, 32, 34 are provided at specific locations in the aircraft. The person-specific IO nodes 20, 22 are contemplated to be portable devices that are associated with individuals and, as such, are not associated with any fixed structure within the aircraft.

As illustrated in FIGS. 1 and 2, the IO nodes 20, 22, 28, 30, 32, 34 connect to the controller 16. The controller is contemplated to incorporate a hierarchical command structure that prioritizes input(s) from the different IO nodes 20, 22, 28, 30, 32, 34. For example, the controller 16 may include a hierarchical command structure where input(s) provided by a crew member override (or nullify) input(s) provided by a passenger. In another contemplated scenario, input(s) provided at one of the IO nodes 20, 22, 28, 30, 32, 34 may be given priority over any other input(s). For example, a crew member may have closed the window shades in the aircraft so that the passengers may enjoy in-flight entertainment. A passenger may wish to open his or her window shade via the window IO node 34. So that the passenger may do this, input(s) from the window IO node 34 may be placed at the top of the hierarchical command tree. Still further, the owner or operator of the aircraft may set the hierarchical command structure for the individual aircraft or a fleet of aircraft, as required or as desired.

Figure 3:
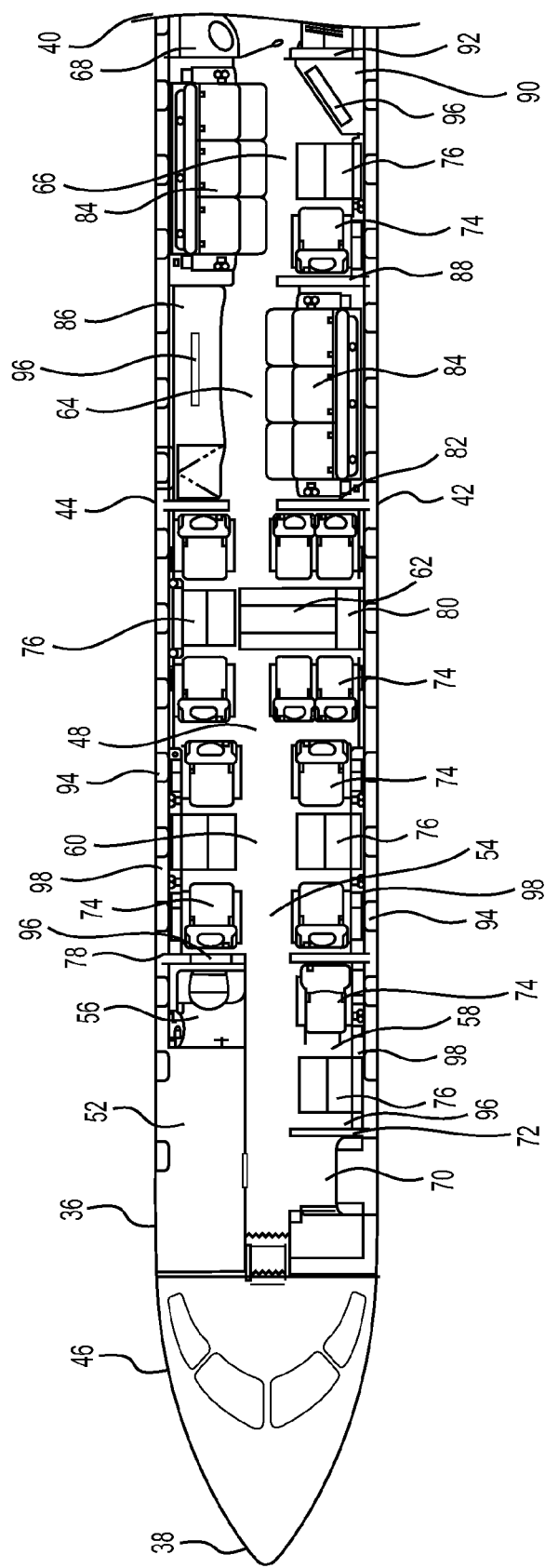
FIG. 3 is a graphical, top view of a portion of an aircraft, depicting one possible configuration for an aircraft cabin that employs the distributed architecture of the present invention.

To facilitate the discussion of the distributed architectures 10, 26 of the present invention, a top view of an aircraft 36 is illustrated in FIG. 3. The aircraft 36 that is depicted is merely exemplary of the infinite possible configurations that are possible and should not be understood to be limiting of the present invention.

As illustrated in FIG. 3, the aircraft 36 has a front end 38, a rear end 40, a left side 42, and a right side 44. The fuselage 46 of the aircraft 36 defines a cabin 48 therein. The layout of the cabin 48 illustrated in FIG. 3 may be provided for a corporate, business, or personal aircraft, such as a private jet.

The cabin 48 includes a cockpit 50, a galley 52, and a passenger area 54. The cabin 48 also includes a forward lavatory 56, a first passenger seating area 58, a second passenger seating area 60, a third passenger seating area 62, a first bedroom 64, a second bedroom 66, and an aft lavatory 68.

The first passenger seating area 58 is positioned adjacent to the galley 52 and the forward lavatory 56. The first passenger seating area 58 is immediately aft of the door 70 that provides ingress into and egress out of the aircraft 36. A first bulkhead 72 separates the area adjacent to the door 70 from the first passenger seating area 58.

The first passenger seating area 58 is defined by one passenger seat 74 and a stowable table 76. The passenger seat 74 is contemplated to be a reclining seat. However, the passenger seat 74 need not recline for purposes of the present invention. The stowable table 76 is contemplated to be stowable in a side compartment adjacent to the passenger seat 74. As required by applicable aviation laws, the table 76 must be stowed for taxi, take-off, and landing. It is noted that the first passenger seating area 58 may be reserved for one or more crew members and, therefore, be understood to be a crew seating area 58. Since the type of individual that uses the seating area 58 is not critical to operation of the present invention, the seating area 58 will be referred to herein as the first passenger seating area 58. It is also noted that, while other seating areas are indicated as being for passengers, crew members may use these areas together with the passengers.

A second bulkhead 78 separates the first passenger seating area 58 and forward lavatory 56 from the second passenger seating area 60.

The second passenger seating area 60 includes four passenger seats 74 that are positioned on opposite sides of a central aisle. Two seats 74 face one another across a table 76 on the right side 44 of the aircraft 36. Similarly, two seats 74 face one another across a stowable table 76 on the left side 42 of the aircraft.

The third passenger seating area 62 is defined by six passenger seats 74, a stowable table 76, and a stowable conference table 80. Two seats 74 face one another across the stowable table 76 on the right ride 44 of the aircraft 36. Four seats 74 face one another (in two pairs) across a stowable conference table 78. As illustrated, when the tables 76, 80 are deployed, they are contemplated to form a single conference table that extends across the width of the cabin 48.

As is apparent from FIG. 3, the second seating area 60 and the third seating area 62 are not separated from one another by any bulkhead or other barrier. Instead, these passenger areas 58, 60 are contemplated to form a continuous passenger area within the cabin 48.

The first bedroom 64 is separated from the third passenger seating area 62 by a third bulkhead 82. The first bedroom 64 includes a divan 84 on the left side 42 of the aircraft 36 and a cabinet 86, such as a media cabinet, on the right side 44 of the cabin 48. It is contemplated that the divan 84 will function both as a couch (or a sofa) and a bed, depending upon its use or configuration.

The second bedroom 66 is separated from the first bedroom 64 by a fourth bulkhead 88. The second bedroom 66 includes a divan 84 on the right side 44 of the aircraft 36. A seat 74 and stowable table 76 are provided on the left side 42 of aircraft 36. Also on the left side 42 is a cabinet 90, which may be provided with a media center, including a monitor or a television.

A fifth bulkhead 92 separates the second bedroom 66 from the rear lavatory 68.

It is noted that the fuselage 46 includes a plurality of windows 94.

In addition, at least four monitors 96 (i.e., video output screens) are provided in the aircraft 36 at various locations. The monitors 96 are contemplated to be positioned to provide video information and entertainment to the passengers in the aircraft 36. It is contemplated that entertainment also may be provided to the passengers via entertainment devices that are associated with the passenger seats 74.

As illustrated, the cabin 48 also includes several side ledges 98 that extend along the length of selected ones of the passenger seating areas 58, 60, 62. Where they are provided, the side ledges 98 are disposed between the passenger seat 74 and the wall of the fuselage 46. As is apparent from FIG. 3, the side ledges 98 are provided in the first passenger seating area 58 and the second passenger seating area 60. While side ledges 98 are not illustrated for the third passenger seating area 62, side ledges 98 may be provided in this seating area without departing from the scope of the present invention.

It is noted that the term "side ledge" is intended to encompass other furniture within the cabin 48 of the aircraft 36 in addition to the typical side ledge 98 that is identified in FIG. 3. Specifically, a cabinet or side ledge 98 may be provided adjacent to the divan 84 in the aircraft 36. While such a side ledge 98 would extend transversely to the travel direction of the aircraft 36, the side ledge 98 may be provided with control functionality. In addition, if the aircraft 36 were to include a bed with night stands, the night stands would be considered as side ledges 98 for purposes of the present invention.

As should be apparent to those skilled in the art, the configuration for the cabin 48 of the aircraft 36 that is provided in FIG. 3 is merely exemplary of the many possible configurations that may be employed in the cabin 48 of the aircraft 36. In other words, the present invention should not be understood to be limited to use on aircraft 36 with the configuration depicted in FIG. 3.

With renewed reference to the distributed architectures 10, 26 of the present invention, either architecture 10, 26 (or any variant thereof) may be employed onboard the aircraft 36. For purposes of the discussion herein, the aircraft 36 includes the second distributed architecture 26.

In this architecture, the passenger IO node 20 is contemplated to be a mobile electronic device, as discussed above. Mobile electronic devices include, but are not limited to, portable computers, tablets, and smartphones. As will be made apparent from the discussion that follows, it is contemplated that the passenger IO node 20 will be capable of receiving and storing a software program, such as an "app." The app may be specific to a particular aircraft or airline, as required or desired. The app is contemplated to provide the software needed for proper interface with the controller 16 for operation of the distributed architecture 26. In other words, the software resident on the passenger IO node 20 is contemplated to be configured to provide input to the CPU 12 and to receive output from the CPU 12.

The crew IO node 22 also is contemplated to be a mobile device, such as a laptop computer, tablet, or smartphone. As with the passenger IO node 20, the crew IO node 22 is contemplated to be provided with a suitable app (or resident software) for interface with the CPU 12.

Where the mobile IO nodes 20, 22 are tablets, it is contemplated that the tablets 20, 22 will be provided with the delivery to the customer of the aircraft 36. In this embodiment, when a passenger boards the aircraft 36, the passenger will be assigned one of the mobile devices for use during the flight.

Alternatively, it is contemplated that a passenger may bring his or her own mobile device on board the aircraft 36. If so, the passenger (and/or crew member) may be prompted to download suitable software (i.e., the app) for interface with the controller 16 prior to boarding the aircraft. Similarly, the members of the flight crew may bring their own mobile devices on board the aircraft 36. If so, members of the flight crew also may be prompted to download suitable software on the personal device. In a further contemplated embodiment, the passenger (and/or crew member) may be prompted to download suitable software after boarding the aircraft, for example.

It is noted that the term "user" is employed to refer to passengers and flight crew members, since both categories of persons are contemplated to be users of the present invention. As such, where the term "passenger" or "flight crew member" are used, the term is not intended to exclude use by any other user, as required or as desired.

As also discussed above, the aircraft 36 may include additional IO nodes.

One of the IO nodes is the bulkhead IO node 28. The bulkhead IO node 28 is contemplated to be provided in selected bulkheads 72, 78, 82, 88, 92. As will be made apparent from the discussion that follows, the bulkhead IO node 28 provides access to several of the functions that are controllable within the cabin 48.

The side ledge IO node 30 is contemplated to be provided in the side ledges 98 adjacent to the passenger seats 74. The side ledge IO node 30 is contemplated to provide all or most of the functionality available through the passenger IO node 20. In one contemplated embodiment, the side ledge IO node 30 may be a tablet device that is incorporated into the side ledge 98 as a permanent part of the side ledge 98.

A window node 34 is contemplated to be provided in association with each window 94 in the aircraft 36.

It is noted that the window node 34 is referred to as a node and also as an IO node. While it is contemplated that the window node 34 will receive input only and, therefore, not include an output (or display) function, the window node 34 is not intended to be limited solely to receipt of input. It is contemplated that the window node 34 may incorporate a display that is changeable and, therefore, provides an output function. In addition, it is noted that the window node 34 includes a visible indication of up and down functions for the window shade associated therewith. While these indicators are not contemplated to change, they may be considered as output displays. In addition, it is contemplated that the window node 32 will enter into a sleep mode where the display becomes dark before being reawakened.

Figure 4:
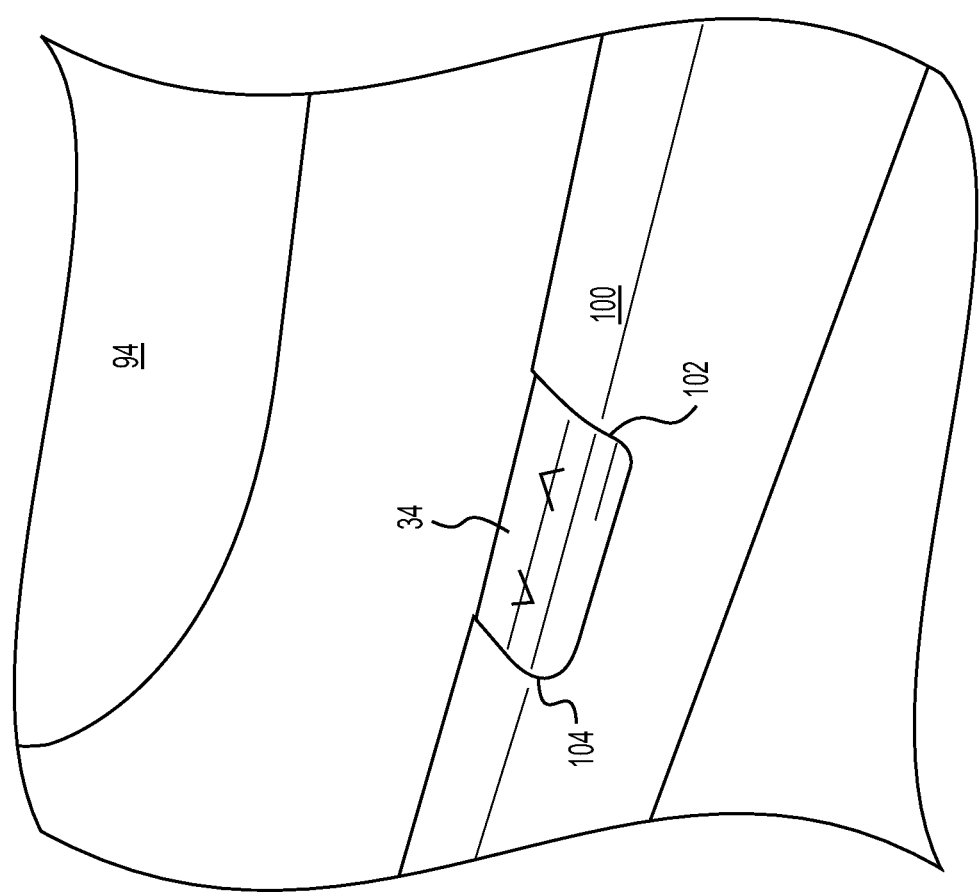
FIG. 4 is a perspective illustration of a window input control node (referred to herein as a "window node") forming a part of the distributed architecture of the present invention.

FIG. 4 is an enlarged, perspective view of one window node 34 that is considered for operation of the present invention. The window node 34 is positioned below the window 94, in a window frame 100. As should be apparent, the window node 34 may be placed in any position adjacent to the window 94 without departing from the scope of the present invention.

The window node 34 is contemplated to be a touch-sensitive panel. As a result, the window node 34 is not contemplated to include any moving components.

The window IO node 34 includes an up switch 102 and a down switch 104. Since the window node 34 is contemplated to be a touch-sensitive panel, the up switch 102 and down switch 104 are merely separate areas defined on the surface of the touch-sensitive panel. As should be apparent to those skilled in the art, the window node 34 need not be a touch-sensitive panel. Any other suitable switch may be employed for the window node 34 without departing from the scope of the present invention.

When a user touches the up switch 102 on the window IO node 34, a signal is generated that is sent to the controller 16. The controller 16 then issues a command to a motor associated with the shade in the window 94 to raise the shade until the passenger releases the up switch 102. The down switch 104 operates in a similar manner.

In an alternative embodiment, it is contemplated that the window IO node 34 will connect directly to a motor that operates the position of the shade for the window 94. In this alternative arrangement, the operation of the window shade will be possible via suitable commands from the CPU 12. For example, a member of the flight crew may choose (via the crew IO node 22) to lower all of the window shades in the aircraft 36 to facilitate viewing of one or more entertainment programs.

Figure 5:
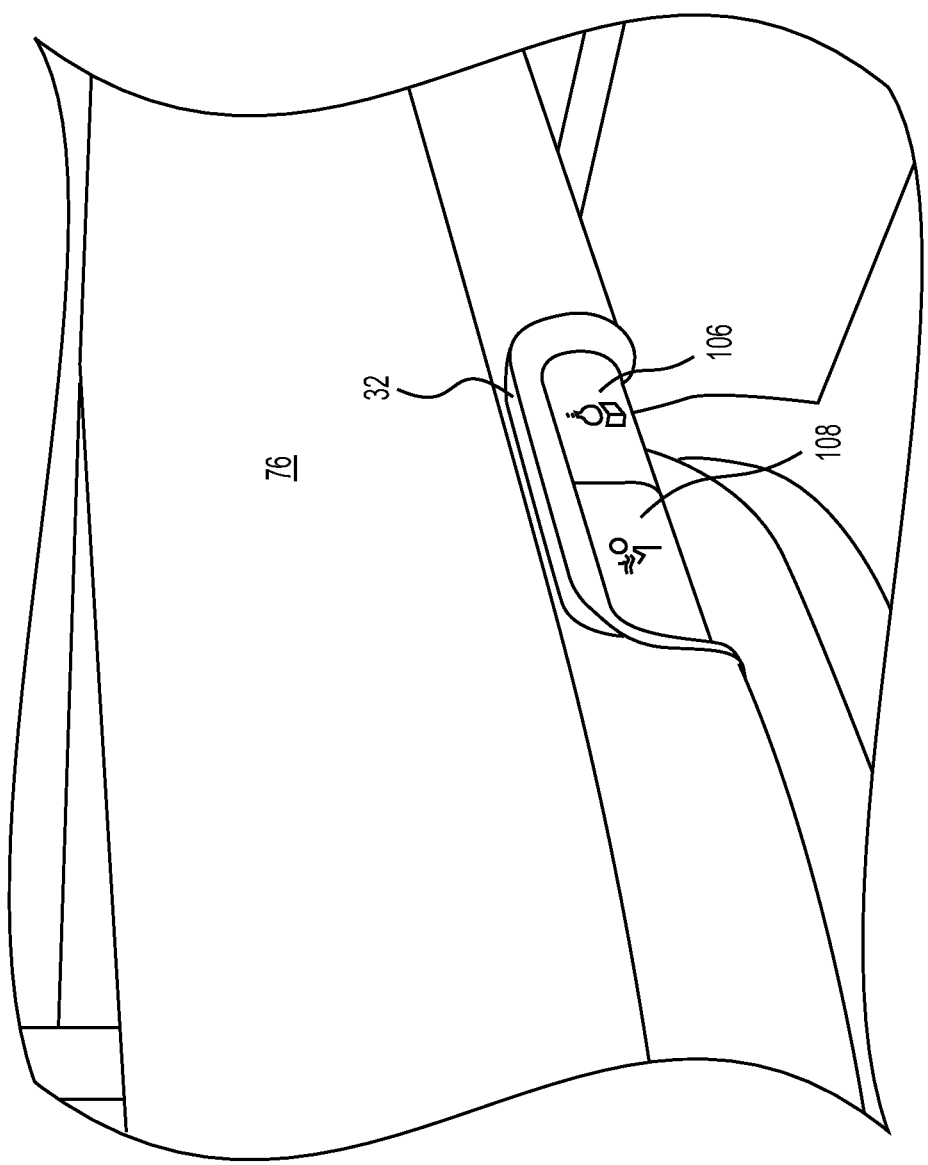
FIG. 5 is a perspective illustration of a table control node (referred to herein as a "table node") forming a part of the distributed architecture of the present invention.

FIG. 5 is a perspective illustration of the table node 32. The table node 32 is contemplated to be provided in an edge of a table, such as the stowable table 76 or the stowable conference table 78. As with the window node 34, the table node 32 is contemplated to be a touch-sensitive panel.

As with the window IO node 34, the table node 32 is contemplated to be an input only node. However, the present invention should not be understood to limit the table node 32 solely to input only. It is possible that the table node 32 may include a changeable display. Moreover, it is also noted that the table node 32 is contemplated to have a fixed, illuminated display or output. As with the window node 34, it is contemplated that the table node 32 will enter into a sleep mode where the display becomes dark before being reawakened.

The table node 32 includes two separate switch regions. The first switch region is an overhead light switch 106. The second switch region is a flight attendant call button 108.

When a passenger touches the overhead light switch 106, a signal is sent to the controller 16. The controller 16 then sends a signal to the overhead light to turn on or off, as appropriate. Alternatively, the overhead light switch 106 may connect directly to the overhead light. In this alternative embodiment, it is contemplated that the CPU 12 also will connect to the overhead light so that control of the overhead light is made possible through one or more of the remaining IO nodes 20-34, as appropriate.

It is noted that there are three types of lighting that may be controllable within the aircraft 36: (1) a reading (or overhead) light, (2) a table light, and (3) a cabin light. A reading light is considered to be local to the passenger's seat 74 and to provide specific illumination from a position above the passenger's seat 74. The table light is contemplated to be provided above a stowable table 76 or a conference table 80, as discussed in connection with the cabin 48 of the aircraft 36. The cabin lights are intended to refer to the lights that are located in the dome above the aircraft cabin 48.

With these definitions in mind, it is contemplated that the light switch 106 will provide control over the operation of the table light. This is a logical choice since the table node 32 is embedded in the edge of the surface of the table 76, 80. It is contemplated, however, that the table node 32 may provide control over the reading light and/or the cabin lights, as required or as desired.

It is noted that the window IO node 34 and the table IO node 32 are but two examples of nodes where limited space is available for control inputs and/or outputs. The present invention should not be understood to be limited to the nodes 32, 34 that are shown and described herein.

Returning to FIG. 5, when a passenger touches the flight attendant call button 108, a signal is sent to the controller 16. The controller 16 then generates a signal that is transmitted to a flight attendant, for example. In this embodiment, it is contemplated that the call button will trigger a notification that may appear on the display of the crew IO node 22. Alternatively, a panel may be provided in the galley 52 to notify a flight attendant that a passenger is in need of assistance.

If a flight attendant receives notification of receipt of a flight attendant call, the flight attendant may respond by addressing the passenger in the seat 74 from which the call signal originated.

Figure 6:
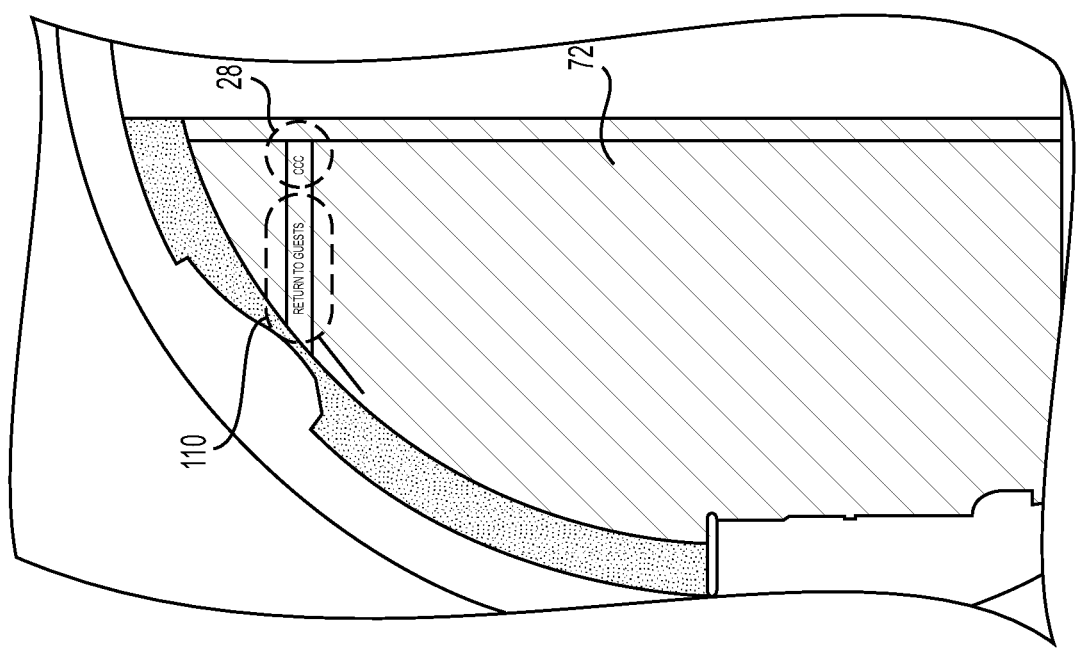
FIG. 6 is a front, graphical view of a bulkhead within the aircraft cabin incorporating a bulkhead IO control node (referred to herein as a bulkhead IO node) also forming a part of the distributed architecture of the present invention.

FIG. 6 is a graphical illustration of one contemplated design for the first bulkhead 72. The same design is anticipated to be incorporated into the remaining bulkheads, as required or as desired.

The first bulkhead 72 is a wall. A notice display area 110 is provided in the bulkhead 72 to convey specific information, such as "fasten seat belts." The bulkhead IO node 28 is contemplated to be positioned adjacent to the notice display area 110. Preferably, the bulkhead IO node 28 is positioned closer to the aisle than the notice display area 110. When positioned in this location, a person is unlikely to obstruct the displayed notice when manipulating the controls provided via the bulkhead IO node 28.

The bulkhead IO node 28 is contemplated to be a touch-sensitive display panel, similar to a tablet or smartphone device. Unlike the window IO node 34 or the table IO node 32, whose displays are contemplated to remain unchanged, the bulkhead IO node 28 is contemplated to change its display information depending upon the icon selected by the passenger or flight crew. In addition, the bulkhead IO node 28 is contemplated to be positioned at a suitable height, so that the passengers are able to read the information displayed thereon.

Figure 7:
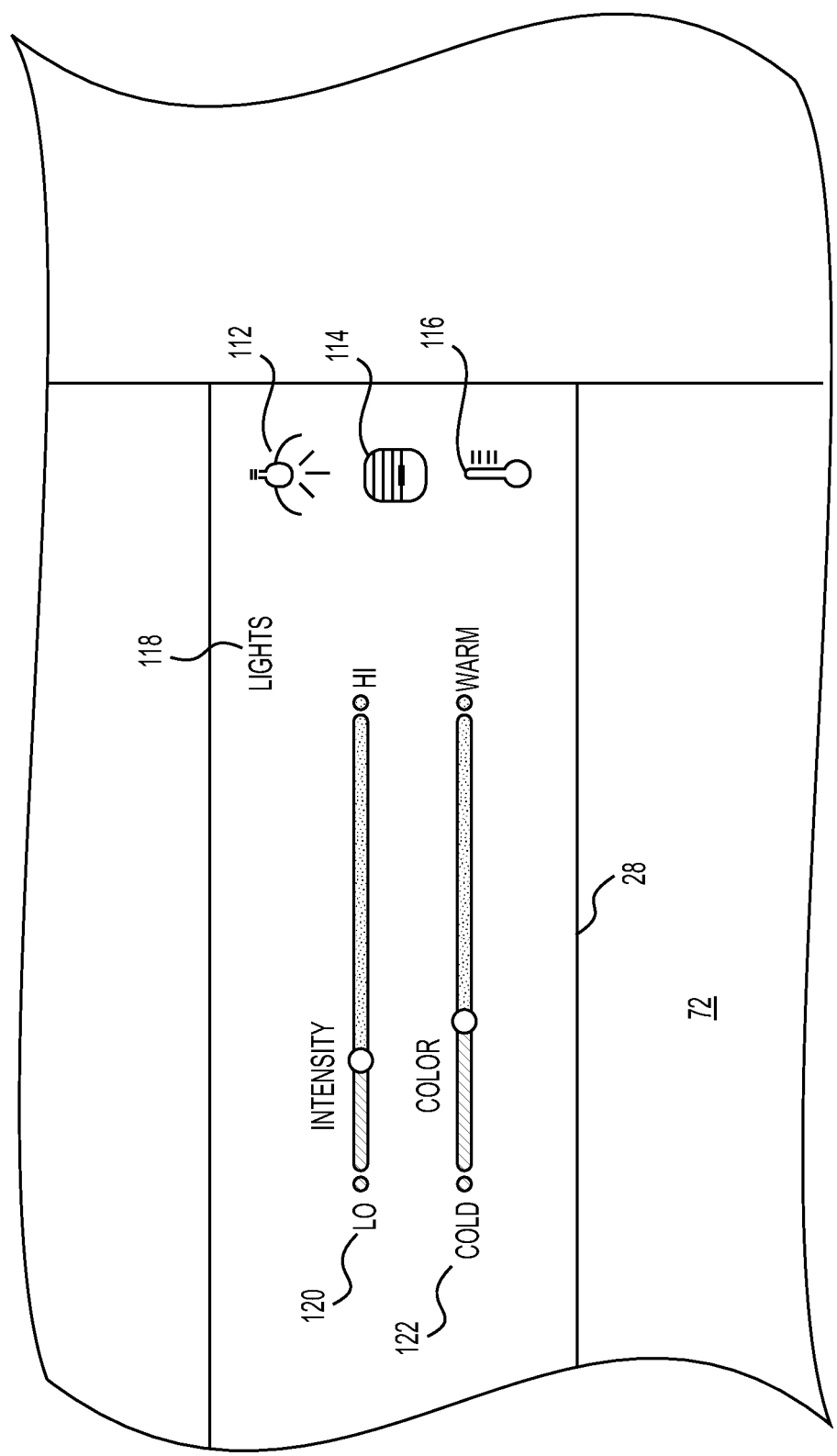
FIG. 7 is an enlarged, elevational view of the bulkhead IO node that is depicted in FIG. 6, illustrating one mode of operation thereof.

An enlarged detail of one contemplated embodiment of the bulkhead IO node 28 is provided in FIG. 7. In this illustration, the bulkhead IO node 28 is installed in the first bulkhead 72.

The bulkhead IO node 28 is contemplated to provide input for control of the cabin lights, the degree to which the window shades are open, and the temperature within the area of the cabin 48 immediately adjacent thereto. As a result, the bulkhead IO node 28 includes three icons: (1) a cabin light icon 112, (2) a window shade icon 114, and (3) a thermostat icon 116. When a person touches any one of the three icons, the bulkhead IO node 28 displays the control information suitable for the selected one of the three menu options. FIG. 7 illustrates the light menu, as indicated by the menu title 118 displayed thereon.

It is noted that the bulkhead IO node 28 need not be limited such that it provides control access to the cabin lights, the window shades, and/or the temperature within the cabin 48 of the aircraft 36. To the contrary, it is contemplated that the bulkhead IO node 28 may provide additional functionality, as desired or as required.

In the illustrated embodiment, the light menu 118 provides two options to permit a person to alter the lighting in the cabin 48. The first icon is an intensity control bar 120. The second is the color control bar 122. In this contemplated embodiment, the control bars 120, 122 are disposed in a horizontal orientation. As should be apparent, the control bars 120, 122 may be vertically oriented without departing from the scope of the present invention. Moreover, a control bars 120, 122 may be displayed in a tilted orientation, as desired.

When a person touches the bulkhead IO node 28 after having selected the cabin light icon 112, the display for the bulkhead IO node 28 changes to display the control bars 120, 122. The user may then touch the surface of the bulkhead IO node 28 to alter one or both of the displayed lighting parameters.

As the user slides his or her finger along the intensity control bar 120, for example, the brightness of the lights changes. It is contemplated that the intensity of the cabin lights may be expressed in terms of lumens, watts, and/or a percentage value between a minimum predetermined intensity (i.e., 0% illumination) and a maximum predetermined intensity (i.e., 100% illumination). Alternatively, the user need not slide his or her fingers along one of the control bars 120, 122 to provide input for the cabin light intensity. It is contemplated that the user may simply tap on the surface of the bulkhead IO node 34 to effectuate such a change.

Similarly, as the person slides his or her fingers along the color control bar 122, the color of the lights in the cabin changes between cool and warm. As should be apparent to those skilled in the art, color change lights are becoming more commonly used, especially since light emitting diodes ("LEDs") are commonly manufactured so that the color of the bulbs may be altered.

"Warm" light is light that includes a predominance of yellow and red hues. "Cool" light includes a predominance of blue hues. As should be apparent to those skilled in the art, the color control bar 122 may be programmed to permit adjustment between a predetermined warm color and a predetermined cool color.

In an alternative embodiment, it is contemplated that the color control bar 122 may include three separate control bars, one each for the red, green, and blue ("RGB") components of the light. In this contemplated embodiment, it is contemplated that the user may select a saturation level for each of the RGB components of the light. In this manner, the user may have a much greater degree of control over the color of the lights in the cabin 48 of the aircraft 36.

Next, as discussed in greater detail below, it is contemplated that control over the lighting in the cabin 48 of the aircraft 36 may encompass the entire cabin 48, a zone within the cabin 48, or a local area immediately adjacent to the passenger's seat 74. A zone includes a subset of the entire cabin 48. Zone and localized control also are contemplated to be available for all of the controllable parameters that are available within the cabin 48 of the aircraft 36.

As noted above, when a person accesses the bulkhead IO node 28, signals are sent to the controller 16. The controller 16 then sends appropriate signals to the devices (such as the cabin lights) on the aircraft 36 in response to the input. Specifically, the cabin lights are adjusted consistently with the input received from the user.

When the window shade icon 114 is touched and the window shade menu appears, the person accessing the menu may adjust the opened condition of one or more of the window shades in the cabin. The window shades are contemplated to be adjustable between a predetermined minimum (i.e., 0% opened) to a predetermined maximum (i.e., 100% opened).

When a person accesses the thermostat icon 116, the person is provided with a suitable icon to adjust the temperature within the cabin 48. It is contemplated that the temperature will be adjustable to within 5-10° C. of standard ambient, which is 25° C. In other words, it is contemplated that the temperature will be adjustable between a predetermined minimum of 15° C. and a predetermined maximum of 35° C. Of course, any other predetermined range may be employed without departing from the scope of the present invention.

Figure 8:
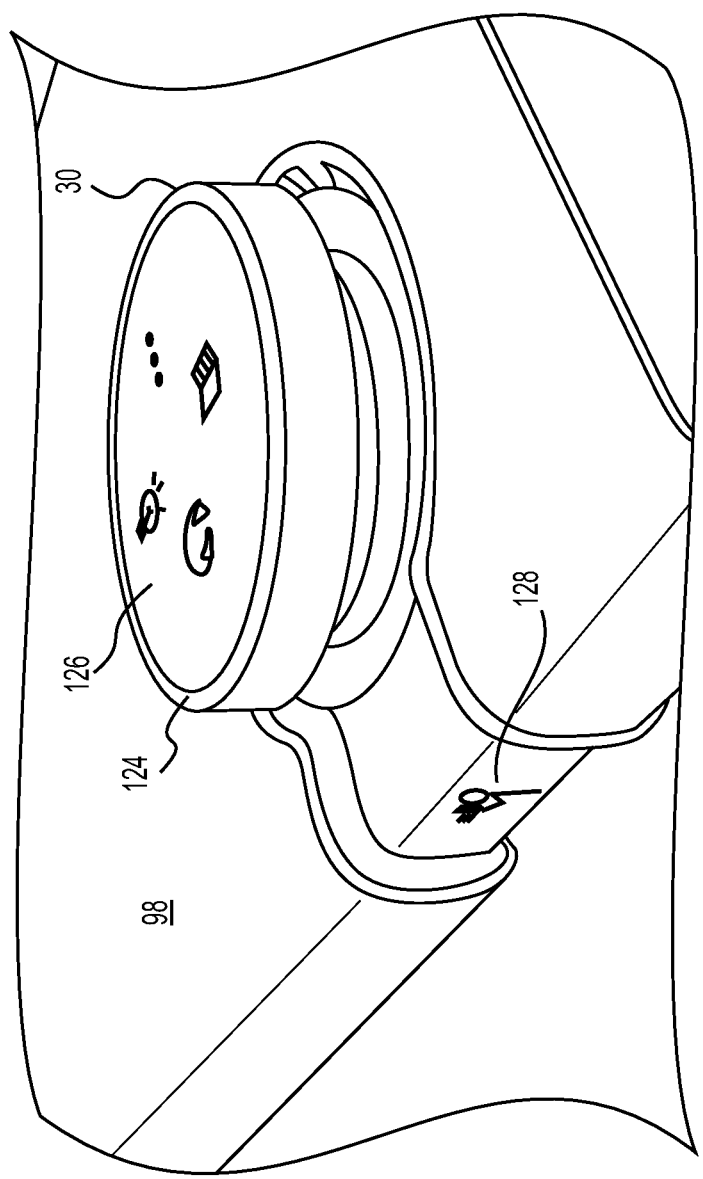
FIG. 8 is a perspective illustration of a side ledge IO control node (referred to herein as a "side ledge IO node") forming a part of the distributed architecture of the present invention.

FIG. 8 is a perspective illustration of one contemplated embodiment of the side ledge IO node 30. The side ledge IO node 30 is contemplated to combine the tactile input of a knob 124 together with a touch-sensitive top surface and display 126. A flight attendant call button 128 is provided adjacent to the side ledge IO node, as shown. The flight attendant call button 128 need not be provided to practice the present invention.

The side ledge IO node 30 is contemplated to provide at least the same control functionality as the bulkhead IO node 28. In addition, the side ledge IO node 30 is contemplated to provide control over many of the same functions as the passenger IO node 20, which is described in greater detail in the paragraphs that follow.

Figure 9:
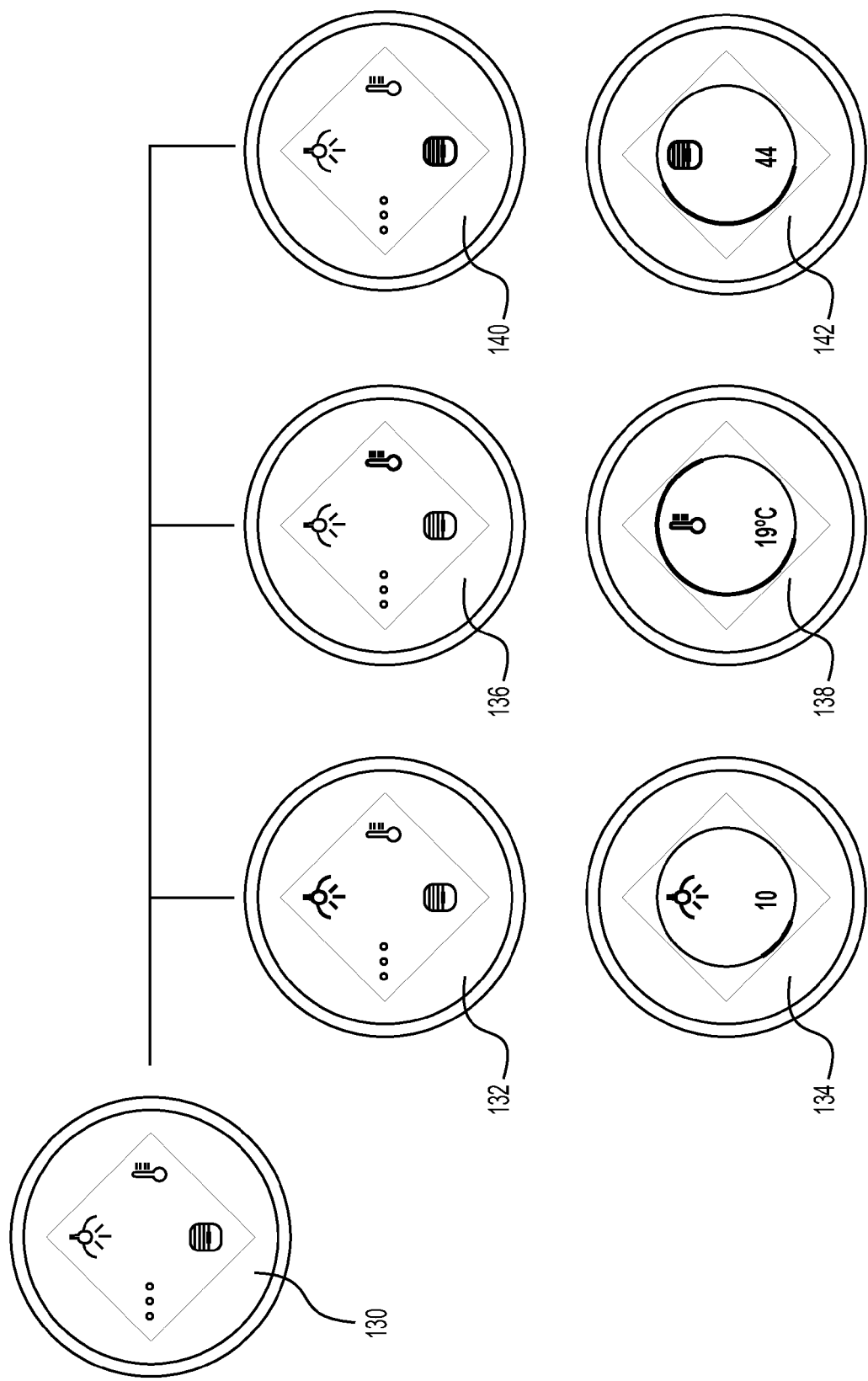
FIG. 9 is a graphical representation of the side ledge IO node depicted in FIG. 8, providing a partial representation of the input decision tree associated with the functionality of that node.

FIG. 9 provides a simple tree diagram that illustrates the functioning of the side ledge IO node 30. When activated initially, the knob 124 displays a main menu 130. The main menu includes a light control icon 112, a window shade icon 114, and a thermostat icon 116. When the light control icon 112 is accessed, as illustrated in the menu 132, the user may turn the knob 124 to adjust the intensity of the light in the cabin 48, as shown by the intensity display 134 (i.e., 10% of maximum). When the thermostat icon 116 is touched, as shown in the thermostat menu 136, the user may turn the knob 124 to change the temperature, as shown in the temperature display 138 (i.e., 19° C.). When the user accesses the window shade icon 114, as shown in the window shade menu 140, the user may turn the knob 124 to change the degree to which the shade is opened (i.e. 40% of maximum).

As before, each input provided by the user is transmitted first to the controller 16 before a control signal is transmitted to the appropriate component responsible for the particular cabin function.

In addition, it is contemplated that the side ledge IO node 30 will provide access to other functions, such as volume control for the media being played. Also, the side ledge IO node 30 may provide access to various menus for selecting media content.

Figure 10:
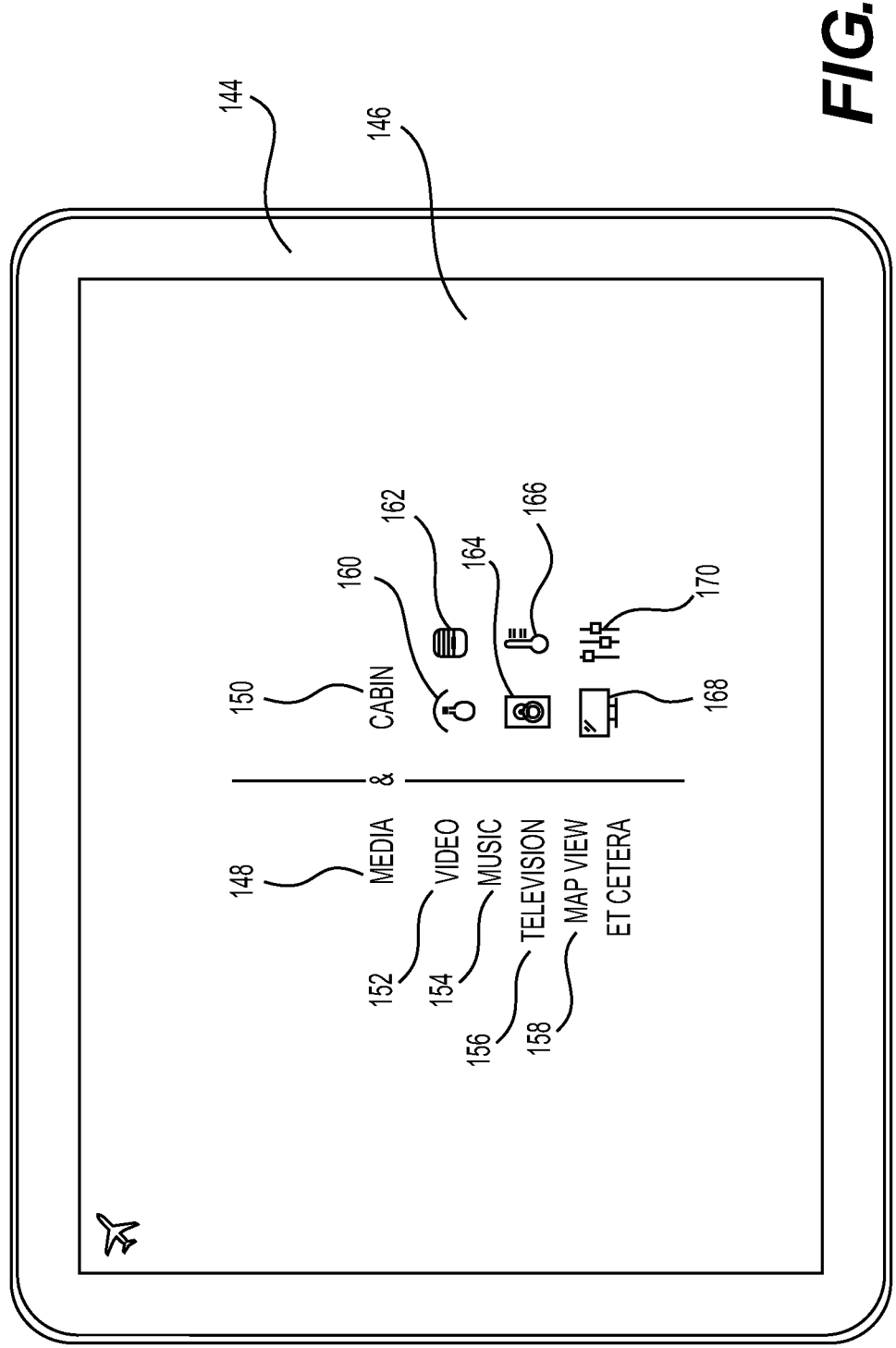
FIG. 10 depicts a first screen from a passenger IO control node (referred to herein as a "passenger IO node") forming a part of the distributed architecture of the present invention.

FIG. 10 illustrates an interface contemplated for the passenger IO node 20. As noted above, the passenger IO node 20 is contemplated to be embodied in a mobile computing device such as a personal computer, tablet, and/or smartphone. As should be apparent, other electronic devices may be employed without departing from the scope of the present invention. In the embodiment illustrated in FIG. 10, the electronic device is a tablet 144 with an interactive, touch screen surface 146.

Figure 12:
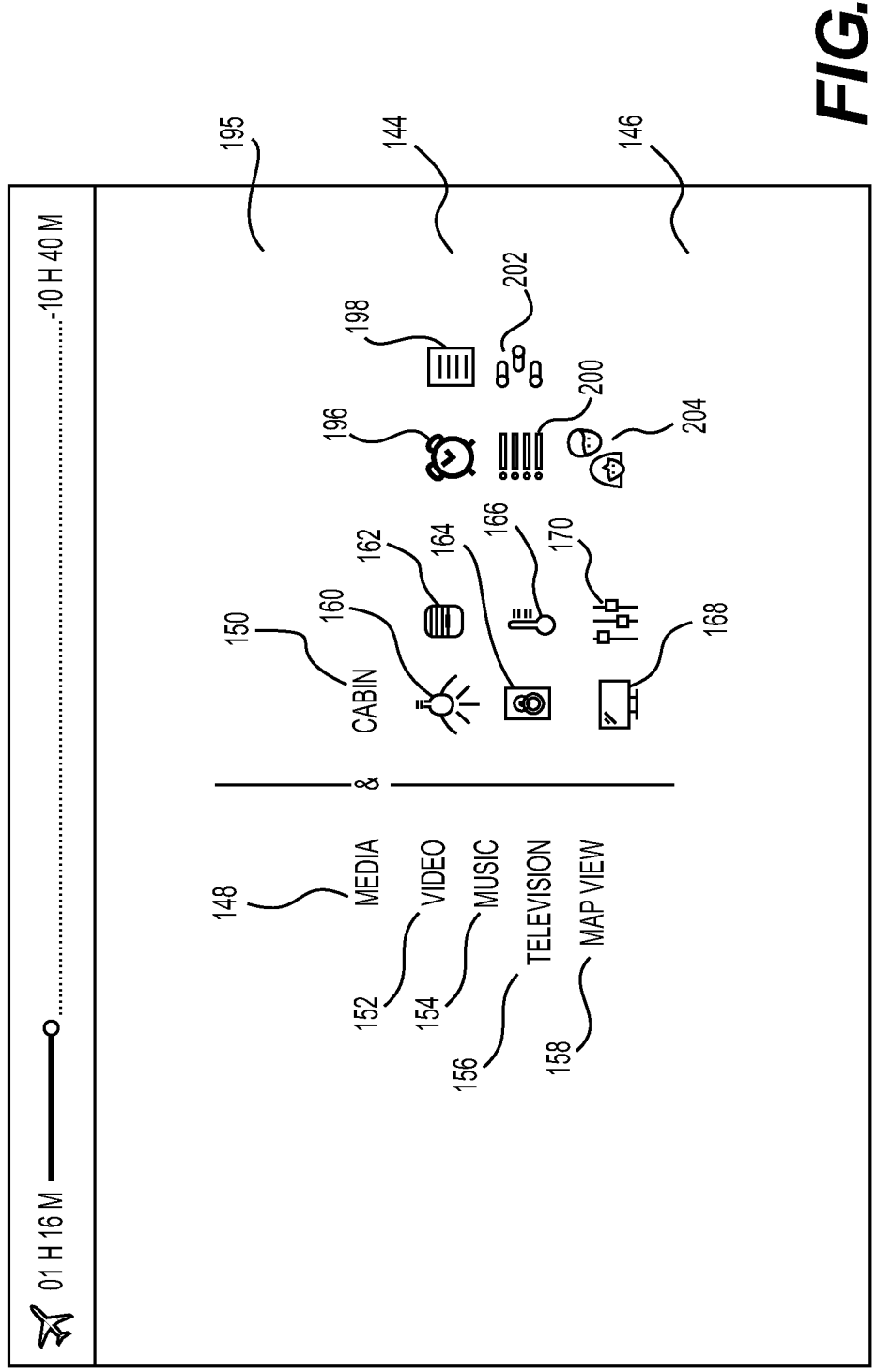
FIG. 12 provides a first screen from a flight crew IO control node (referred to herein as a "crew IO node"), illustrating several of the functions accessible by a member of the flight crew.

Similarly, FIG. 12 illustrates an interface contemplated for the crew IO node 22. As noted above, the crew IO node 22 is contemplated to be embodied in a mobile computing device such as a personal computer, tablet, and/or smartphone. As should be apparent, other electronic devices may be employed without departing from the scope of the present invention. In the embodiment illustrated in FIG. 12, the electronic device is a tablet 144 with an interactive, touch screen surface 146. The same reference numbers are used for the tablet 144 for the passenger IO node 20 and the crew IO node 122, because both are contemplated to be tablets 144, with the distinguishing characteristic being the software operating thereon.

The passenger IO node 20 is contemplated to provide access to two separate categories of functions: (1) a media functions menu 148 and (2) a cabin functions menu 150.

Media functions include, but are not limited to, features associated with: (1) a video icon 152, (2) a music icon 154, (3) a television icon 156, and (4) a map view icon 158. The Video icon 152 provides access to functions that include, but are not limited to, a library of video programs that are accessible to the user from the database 18. The audio icon 154 provides access to audio functions that include a library of audio programs that are available to the user. The television icon 156 provides access to television functions that include a library of television programs that are available to the user. Television programs also may include television channels that are made available for those aircraft 36 equipped to receive television programming in real time (i.e., via satellite). The map view icon 158 provides access to features that may include a global map view that permits the user to identify where the aircraft 36 is in relation to the surface of the Earth. In addition, a local map view function, with associated interactive features, may permit the user to access information about the user's destination location, for example. As should be apparent, the media functions menu 148 may include other functions without departing from the scope of the present invention.

Cabin functions include, but are not limited to, features associated with: (1) a cabin light icon 160, (2) a window shade icon 162, (3) an audio icon 164, (4) a thermostat icon 166, (5) a video icon 168, and (6) a presets icon 170. The cabin light icon 160 provides access to control over the cabin lights, as discussed above. The cabin light icon 160 also may provide access to other lighting in the cabin 48 of the aircraft 36. The window shade icon 162 provides access to control over one or more of the window shades in the cabin 48. The audio icon 164 is duplicative of the audio icon 154 discussed in connection with the media menu 148. The thermostat icon 166 provides access to controls over the temperature within all or part of the cabin 48 of the aircraft 36. The video icon 168 provides access to video programming, as discussed above with respect to the media menu 148. The presets icon 170 provides access to selected, preset conditions for the cabin 48 of the aircraft. One preset may be a "sleep" control that dims the lights and closes the window shades at least in the immediate vicinity of the user.

Figure 11:
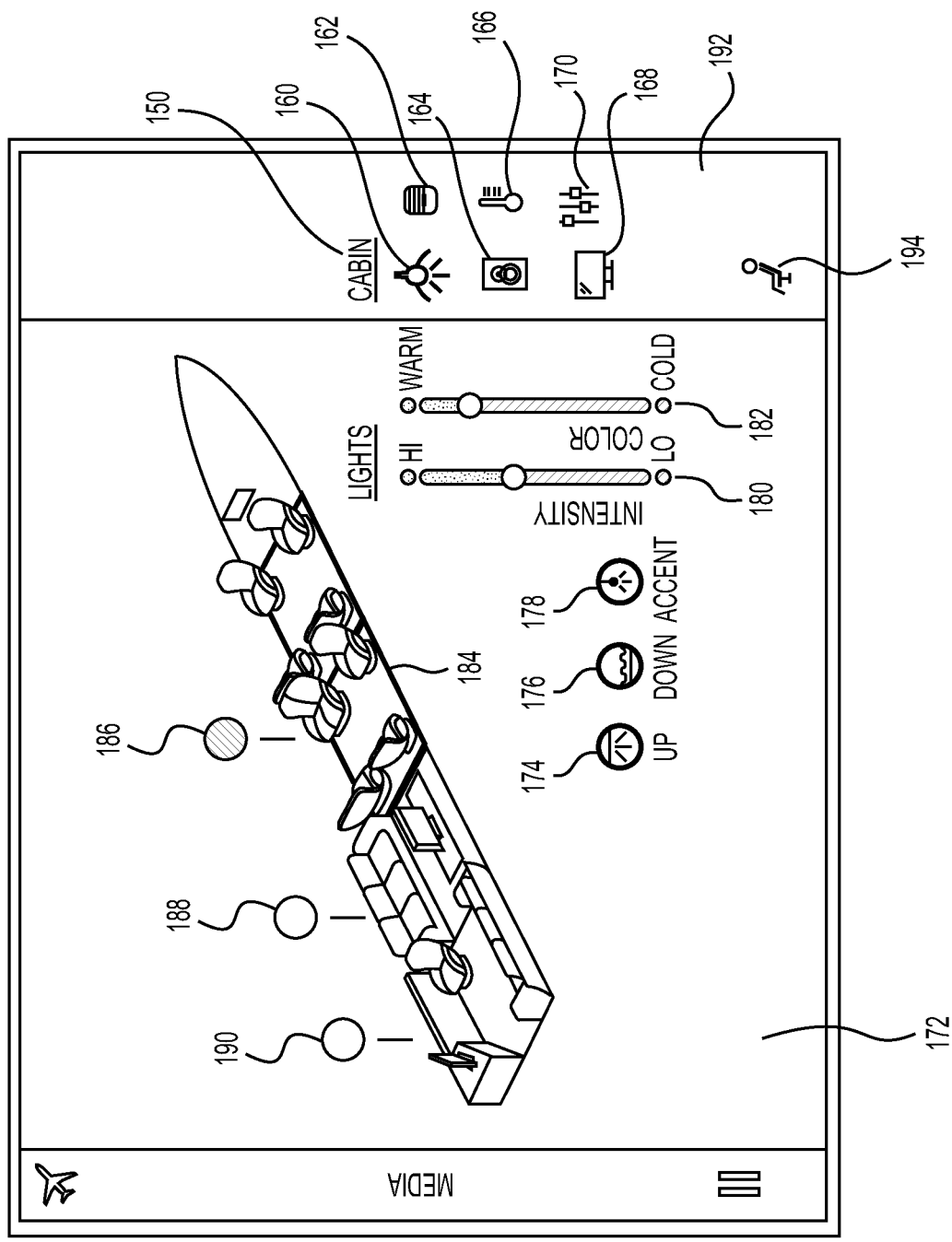
FIG. 11 depicts a second screen contemplated for the passenger IO control node depicted in FIG. 9.

FIG. 11 is one contemplated lights GUI 172 for control over the lights in the cabin 48. The lights GUI 172 includes a window shades up icon 174, a window shades down icon 176, an accent light icon 178 (for access to controls of a reading light, for example), a light intensity control bar 180, and a light color control bar 182.

The lights GUI 172 also includes an isometric cabin GUI 184 that illustrates a portion of the cabin 48 of the aircraft 36. With respect to the isometric cabin GUI 184, three control areas 186, 188, 190 are selectable so that the user may control the lights in the selected section of the aircraft 36.

While the lights GUI 172 is illustrated, the same approach may be taken for any of the features that are controllable within the aircraft 36. For example, the window shades icon 162 is contemplated to access an isometric cabin GUI 184 permitting control over one or more of the window shades in the cabin 48 of the aircraft. This includes control over media and media volume, the location in the cabin 48 where the media is to be played, etc.

With respect to the window shades, it is noted that the window shades may be of any particular type without departing from the scope of the present invention. For example, the window shades may be made from a sheet of material that moves (via a motor, for example) in front of the window to block the transmission of light therethrough. Alternatively, the window shades may be made from an electrochromic material. Electrochromic materials respond to signals by altering their color and/or opacity.

FIG. 11 also illustrates a side menu bar 192, which provides the cabin menu 150. In the side bar menu 192 also includes a seat icon 194 that provides control over the reclinability (among other adjustable features) of the passenger's seat 74.

FIG. 12 provides one contemplated crew display 195 display for the flight crew 10 node 22. The crew display 185 provides additional functionality for crew members. Specifically, the crew display 195 includes: (1) a scheduling icon 196, (2) a notes icon 198, (3) a report icon 200, (4) a controls icon 202, and (5) a passenger manifest icon 204. The scheduling icon 196 is contemplated to provide access to scheduling functions, such as when a movie is to be played or when a meal is to be served. The notes icon 198 is contemplated to provide a pad on which the crew member may enter items of information that are pertinent to aspects of a particular flight. The report icon 200 is contemplated to provide, for example, a sunning inventory of the supplies on board the aircraft 36. When this function is accessed, the flight crew member may be able to determine if additional coffee is needed for the galley, for example. The controls icon 202 is contemplated to provide control over aspects of the operation of the cabin 48 of the aircraft. For example, this icon may provide access to controls for a water heater on the aircraft 36, permitting the crew member to adjust the temperature of the hot water dispensed therefrom.

Figure 13:
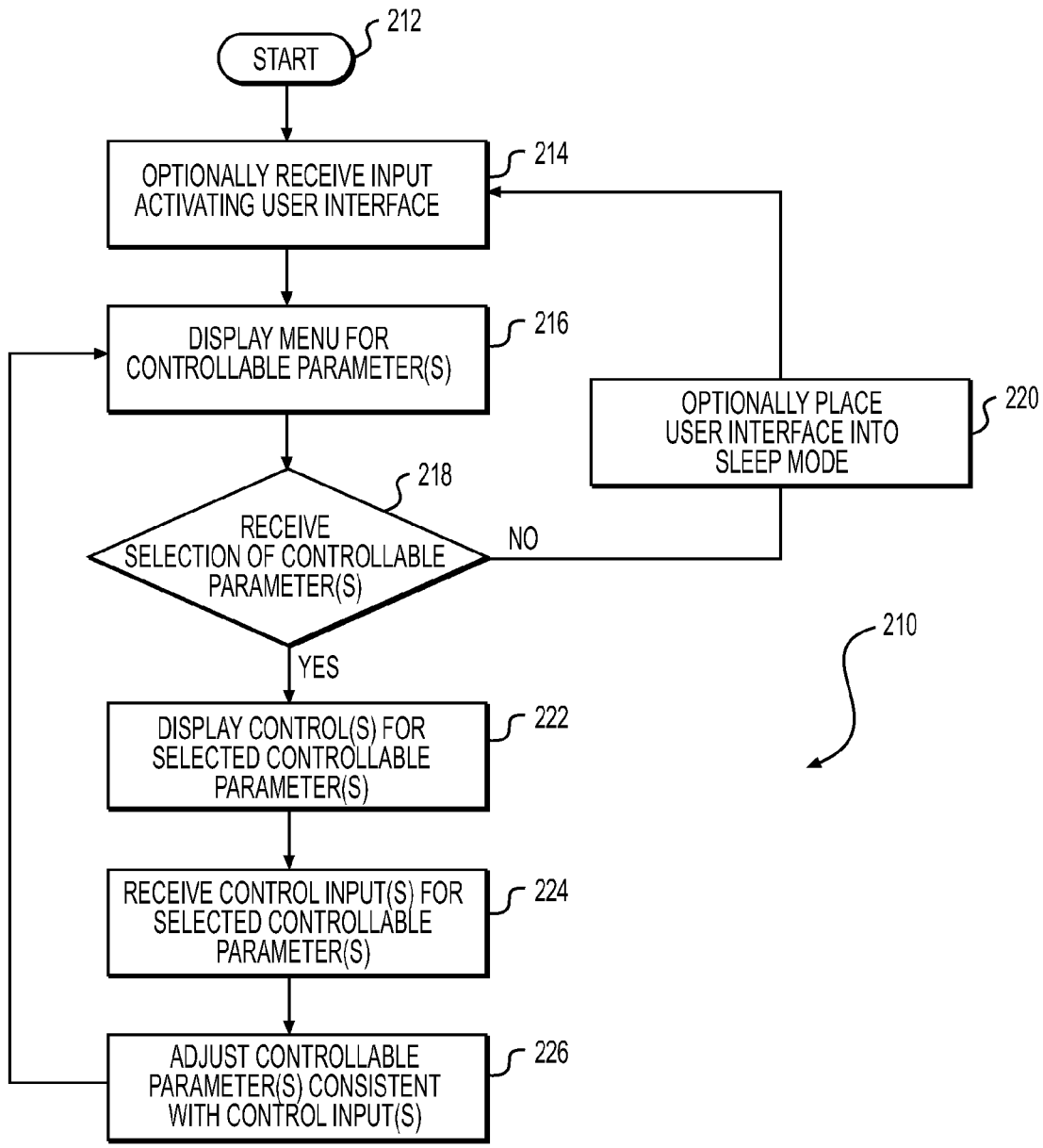
FIG. 13 illustrates one contemplated method for the operation of the distributed architecture of the present invention.

FIG. 13 illustrates one contemplated method 210 that is considered for operation of the distributed architecture 10, 26 of the present invention. The method 210 is considered to be generic to the operation of the any of the IO nodes of the present invention.

The method 210 begins at step 212. The method 210 proceeds to step 214 where the method optionally receives input activating the user interface associated with the IO node.

It is contemplated that the IO node might not provide any display until activated. A passenger or crew member may activate the IO node by touching the touch-sensitive surface thereof. Alternatively, a switch may be provided to turn on or turn off the IO node.

Separately, it is contemplated that the IO node may operate such that the node remains in a constant on mode of operation. In this contemplated mode of operation, the IO node is contemplated to provide a display at all times during flight.

From optional step 214, the method 210 proceeds to step 216, where a menu for controllable parameters is displayed. The menu includes, but is not limited to, a display of the cabin light icon 160, the window shade icon 162, and the thermostat icon 166. As discussed above, each of these icons is associated with a controllable parameter on board the aircraft 36.

The method 210 then proceeds to step 218, where a selection of one of the controllable parameters is received by the method 210. As noted above, the input may be received when a person taps on a particular icon 160, 162, 166. In an alternative contemplated operation, the user may use a swiping motion to access the menus associated with the icons 160, 162, 166. Specifically, the user may use a swiping motion, by dragging his or her finger across the surface of the tablet 144, to navigate through the different menus associated with each of the icons 160, 162, 166.

If no input is received at step 218, the method 210 proceeds to an optional step 220 where the bulkhead IO node 28 is placed into a sleep mode. In the sleep mode, the IO node may go dark. Alternatively, it may continue to display the screen last selected by a user. In still another embodiment, the IO node may default to the main menu.

If the user selects one of the controllable parameters by selecting one of the icons 160, 162, 166, the method 210 proceeds to step 222. At step 222, the method 210 displays the controls appropriate for the selected controllable parameter. For example, if the cabin light icon 160 is selected, the light intensity control bar 180 and the color control bar 182 may be displayed.

Once the control(s) are displayed, the method 210 proceeds to step 224. At step 224, the method receives control input(s) from the user to adjust one or more of the controllable parameters in the cabin 48 of the aircraft 36.

After receiving the input at step 224, the method 210 proceeds to step 226, where the selected, controllable parameters are adjusted according to the input provided by the user.

After step 226, the method 210 is contemplated to return to step 216 and display the main menu.

As noted above, it is contemplated that the IO node will operate after being awakened by a person's touch. In keeping with this mode of operation, it is contemplated that the IO node will enter into a sleep mode (or go dark) after the expiry of a predetermined time period. For example, if the IO node has not received tactile input for a period of two (2) minutes, the IO node will be instructed to enter into the sleep mode where it will await the next command.

As discussed above, inputs provided by any of the IO nodes 20, 22 and 28-34 are first provided to the controller 16. The reason for this is simple: the controller 16 provides overall control for the functions that are available to passengers in the cabin 48. Without a centralized control, it is possible that passengers might issue instructions that are contrary to one another. The controller 16 may be programmed to address these conflicts or issue an alarm when conflicts arise.

As noted above, it is contemplated that the controller 16 will incorporate a command hierarchy that will resolve any conflicts between the various inputs received from the various nodes 20, 22, 28, 30, 32, 34. The command hierarchy may be based on the status of the person (i.e., crew versus passenger) or based on the location of the IO node (i.e., window IO node 34 versus bulkhead IO node 28). It is also noted that the command and control functions need not be incorporated solely in the controller 16 but may be incorporated into other features without departing from the scope of the present invention.

As also noted above, the present invention contemplates reliance on an isometric view of the cabin 48 of the aircraft 36. The isometric view permits a user to select specific controllable features and zones within the aircraft 36. For example, the user may select one of the passenger seating areas 58, 60, 62 over which control is to be asserted. Alternatively, the user may select an individual seat 74 over which controls are to be asserted. Still further, by selecting a suitable icon from an isometric view of the cabin 48 of the aircraft 36, the user may assert control over one or more of the monitors 96 within the aircraft 36. The isometric view of the cabin 48 of the aircraft 36 provides an easily understood interface for a user to direct inputted commands and assert control over one or more controllable parameters within the cabin 48 of the aircraft 36.

As noted above, the present invention is not intended to be limited solely to the embodiment(s) described herein. To the contrary, those skilled in the art should appreciate that the present invention may be embodied in one or more variations and equivalents to the embodiment(s) described herein. The present invention is intended to encompass those variations and equivalents.

What is claimed is:

1. A distributed architecture for multi-nodal control of functions in an aircraft cabin, comprising:
   a processor;
   a controller operatively connected to the processor;
   a passenger IO node operatively connected to the controller; and
   a crew IO node operatively connected to the controller;
   wherein the controller controls at least one controllable parameter in response to inputs received from the passenger IO node and the crew IO node,
   wherein the at least one controllable parameter comprises at least one of light intensity in the aircraft cabin, color of light in the aircraft cabin, temperature in the aircraft cabin, and a degree of openness of one or more window shades in the aircraft cabin, and
   wherein the controller includes a command hierarchy to prioritize inputs received from the passenger IO node and the crew IO node, thereby avoiding conflicts between the inputs.

2. The distributed architecture of claim 1, wherein the controllable parameters are associated with at least one of the entire cabin of the aircraft, at least one zone within the cabin of the aircraft, or at least one seat within the cabin of the aircraft.

3. The distributed architecture of claim 1, wherein the controllable parameters also includes at least one of media type, media content, media volume, scheduling, notes, reports, presets, and a passenger manifest.

4. The distributed architecture of claim 1, wherein the passenger IO node comprises at least one of a side ledge IO node and a passenger mobile IO node.

5. The distributed architecture of claim 4, wherein the side ledge IO node is disposed in at least one of a ledge adjacent to a passenger seat, a cabinet adjacent to a divan, or a night stand adjacent to a bed.

6. The distributed architecture of claim 4, wherein the crew IO node comprises at least one of a mobile crew IO node and a non-mobile crew IO node.

7. The distributed architecture of claim 6, wherein the controller controls the at least one controllable parameter in response to inputs received from a bulkhead IO node.

8. The distributed architecture of claim 7, wherein the bulkhead IO node is disposed on a bulkhead within the aircraft cabin.

9. The distributed architecture of claim 7, wherein the controller includes a command hierarchy to prioritize inputs received from the bulkhead IO node, the side ledge IO node, the passenger mobile IO node, and the crew mobile IO node, thereby avoiding conflicts between the inputs.

10. The distributed architecture of claim 1, wherein the command hierarchy prioritizes inputs from the crew IO node for at least one of the light intensity in the aircraft cabin, color of light in the aircraft cabin, temperature in the aircraft cabin, and a degree of openness of one or more window shades in the aircraft cabin, and prioritizes the passenger IP node of at least one other of the light intensity in the aircraft cabin, color of light in the aircraft cabin, temperature in the vehicle cabin, and a degree of openness of one or more window shades in the aircraft cabin.

11. A method of operation for a distributed architecture for multi-nodal control of functions in an aircraft cabin, wherein the system comprises a processor, a controller operatively connected to the processor, and a graphical user interface embodied in a passenger IO node operatively connected to the controller and a crew IO node operatively connected to the controller, the method comprising:
    displaying a menu for at least one controllable parameter on the graphical user interface of at least one of the passenger IO node and the crew IO node;
    receiving a control input for the at least one controllable parameter from the at least one of the passenger IO node and the crew IO node;
    adjusting, by the controller, the at least one controllable parameter consistent with the control input,
    wherein the at least one controllable parameter comprises at least one of light intensity in the aircraft cabin, color on light in the aircraft cabin, temperature in the aircraft cabin, and a degree of openness of at least one window shade in the aircraft cabin, and
    wherein the controller includes a command hierarchy to prioritize the inputs received from the passenger IO node and the crew IO node, thereby avoiding conflicts between the inputs.

12. The method of claim 11, wherein the controllable parameters also includes at least one of media type, media content, media volume, scheduling, notes, reports, presets, and a passenger manifest.

13. The method of claim 12, wherein the media content includes a video library, an audio library, and a map view.

14. The method of claim 13, wherein the map view comprises a global map view and a local map view.

15. The method of claim 11, further comprising:
    placing the graphical user interface into a sleep mode if selection of a controllable parameter is not received.

16. The method of claim 11, wherein the controllable parameter is associated with at least one of the entire cabin of the aircraft, at least one zone within the cabin of the aircraft, and at least one seat within the cabin of the aircraft.

17. The method of claim 11, wherein the controllable parameter is controllable via an interface presenting an isometric view of at least a portion of the cabin of the aircraft.

18. The method of claim 11, wherein light intensity includes an illumination for at least one of a cabin light, a table light, and a reading light.

19. The method of claim 11, wherein the displaying of the menu for the at least one controllable parameter includes displaying a light icon, a media icon, a thermostat icon, and a window shade icon.

20. The method of claim 11, wherein the passenger IO node comprises at least one of a side ledge IO node and a passenger mobile IO node.

21. The method of claim 20, wherein the side ledge IO node is disposed in at least one of a ledge adjacent to a passenger seat, a cabinet adjacent to a divan, or a night stand adjacent to a bed.

22. The method of claim 20, wherein the crew IO node comprises at least one of a mobile crew IO node and a non-mobile crew IO node.

23. The method of claim 22, wherein the controller controls the at least one controllable parameter in response to inputs received from a bulkhead IO node, and wherein the bulkhead 10 node is disposed on a bulkhead within the aircraft cabin.

24. The method of claim 23, wherein the controller includes a command hierarchy to prioritize inputs received from the bulkhead IO node, the side ledge IO node, the passenger mobile IO node, and the crew mobile IO node, thereby avoiding conflicts between the inputs.

25. An executable computer program product providing instructions for a method of operation for a distributed architecture for multi-nodal control of functions in an aircraft cabin, wherein the system comprises a processor, a controller operatively connected to the processor, and a graphical user interface embodied in a passenger IO node operatively connected to the controller and a crew IO node operatively connected to the controller, wherein the instructions comprise:
    displaying a menu for at least one controllable parameter on the graphical user interface of at least one of the passenger IO node and the crew IO node;
    receiving a control input for the at least one controllable parameter from the at least one of the passenger IO node and the crew IO node;
    adjusting by the controller, the at least one controllable parameter consistent with the control input,
    wherein the at least one controllable parameter comprises at least one selected from a group comprising light intensity, light color, temperature, and a degree of openness of at least one window shade, and
    wherein the controller includes a command hierarchy to prioritize the inputs received from the passenger IO node and the crew IO node, thereby avoiding conflicts between the inputs.

26. The executable computer program product of claim 25, wherein the controllable parameters also includes at least one of media type, media content, media volume scheduling, notes, reports, presets, and a passenger manifest.

27. The executable computer program product of claim 25, further comprising:
    placing the at least one of the passenger IO node and the crew IO node into a sleep mode if selection of a controllable parameter is not received.

28. The executable computer program product of claim 25, wherein the controllable parameter is associated with at least one of the entire cabin of the aircraft, at least one zone within the cabin of the aircraft, and at least one seat within the cabin of the aircraft.

29. The executable computer program of claim 25, wherein the passenger IO node comprises at least one of a side ledge IO node and a passenger mobile IO node.

30. The executable computer program of claim 29, wherein the side ledge IO node is disposed in at least one of a ledge adjacent to a passenger seat, a cabinet adjacent to a divan, or a night stand adjacent to a bed.

31. The executable computer program of claim 29, wherein the crew IO node comprises at least one of a mobile crew IO node and a non-mobile crew IO node.

32. The executable computer program of claim 31, wherein the controller controls the at least one controllable parameter in response to inputs received from a bulkhead IO node, and wherein the bulkhead IO node is disposed on a bulkhead within the aircraft cabin.

33. The executable computer program of claim 32, wherein the controller includes a command hierarchy to prioritize inputs received from the bulkhead IO node, the side ledge 10 node, the passenger mobile IO node, and the crew mobile IO node, thereby avoiding conflicts between the inputs.

\* \* \* \* \*